United States Patent
Townsend et al.

(10) Patent No.: US 6,196,619 B1
(45) Date of Patent: Mar. 6, 2001

(54) VEHICLE CLOSURE PANEL HAVING AN INTRUSION BEAM AS PRIMARY STRUCTURE

(75) Inventors: John A. Townsend; Mohamed El-Sayed, both of Bloomfield Hills, MI (US)

(73) Assignee: Joalto Design, Inc., Southfield, MI (US)

(*) Notice: Subject to any disclaimer, the term of this patent is extended or adjusted under 35 U.S.C. 154(b) by 0 days.

(21) Appl. No.: 09/152,780

(22) Filed: Sep. 14, 1998

Related U.S. Application Data

(63) Continuation-in-part of application No. 08/829,460, filed on Mar. 28, 1997, now Pat. No. 5,908,216, which is a continuation-in-part of application No. 08/577,649, filed on Dec. 22, 1995, now Pat. No. 5,806,917.

(51) Int. Cl.[7] ..................................................... B60J 5/00
(52) U.S. Cl. ....................................................... 296/146.6
(58) Field of Search ............................. 296/146.5, 146.6, 296/188; 49/502

(56) References Cited

U.S. PATENT DOCUMENTS

| | | | |
|---|---|---|---|
| 780,331 | 1/1905 | Fletcher | 49/425 |
| 1,096,402 | 5/1914 | Strauss | 49/420 |
| 1,185,783 | 6/1916 | Edwards | 49/420 |
| 1,287,606 | 12/1918 | Allmand | 49/420 |
| 1,713,165 | 5/1929 | Bridge | 49/425 |
| 1,940,444 | 12/1933 | Burgman | 49/40 |
| 1,972,556 | 9/1934 | Goldberg . | |
| 2,036,118 | 3/1936 | Carr . | |
| 2,100,561 | 11/1937 | Kliesrath | 280/106 |
| 2,160,099 | 5/1939 | Zeligman et al. | 49/40 |
| 2,622,919 | 12/1952 | Scott . | |
| 2,650,387 | 9/1953 | Foss | 49/420 |
| 2,650,857 | 9/1953 | Watter et al. . | |
| 2,651,541 | 9/1953 | Surles . | |
| 2,785,921 | 3/1957 | Barenyi . | |
| 2,819,114 | 1/1958 | Lake . | |

(List continued on next page.)

FOREIGN PATENT DOCUMENTS

| | | | |
|---|---|---|---|
| 225087 | 4/1943 | (CH) | 296/155 |
| 895409 | 11/1953 | (DE) | 296/155 |
| 1220266 | 6/1966 | (DE) | 296/65.1 |

(List continued on next page.)

OTHER PUBLICATIONS

International Search Report for International Application No. PCT/US99/20937.
Patent Abstracts of Japanese Patent No. 58 185317 dated Oct. 29, 1983 for Car Door.

*Primary Examiner*—Dennis H. Pedder
(74) *Attorney, Agent, or Firm*—Rader, Fishman & Grauer PLLC

(57) ABSTRACT

A vehicle closure panel includes an outer frame that is connected to a central beam portion to provide a primary structure that resists deformation and efficiently distributes impact forces during a collision. The present invention can be used with or without structural key members and mating recesses to integrate the closure panel with the rest of the vehicle body, depending on design criteria. Also, primary structure of the present invention provides a structural modularity for closure panels that simplifies design by reducing the number of overall parts and uses the primary structure alone to meet the demands for crash testing. Thus, a basic structure is relied on for crash strength while accompanying secondary structures provide cosmetic differences. The inventive intrusion frame can be used with conventionally hinged passenger doors (both front and rear), vertically sliding doors, rear minivan doors, utility vehicle lift-gates, tailgates, and cargo doors, trunks, sliding van doors, or any vehicle door opening where it is desired to limit intrusion into the vehicle during a collision.

22 Claims, 15 Drawing Sheets

U.S. PATENT DOCUMENTS

| | | | |
|---|---|---|---|
| 3,191,993 | 6/1965 | Parks | 297/388 |
| 3,322,463 | 5/1967 | Neale et al. | 297/417 |
| 3,397,487 | 8/1968 | Hunt et al. | 49/420 |
| 3,567,209 | 3/1971 | Lathers | 296/50 |
| 3,594,036 | 7/1971 | Cadiou | 296/155 |
| 3,623,768 | 11/1971 | Capener | 297/390 |
| 3,645,043 | 2/1972 | Velavicius et al. | 49/370 |
| 3,699,716 | 10/1972 | Wanlass | 49/40 |
| 3,718,364 | 2/1973 | Fischer et al. | |
| 3,788,686 | 1/1974 | Rossie et al. | 296/146.6 |
| 3,807,799 | 4/1974 | Freedman | 297/417 |
| 3,819,228 | 6/1974 | Cornacchia | 296/146.9 |
| 3,887,227 | 6/1975 | Deckert | |
| 3,888,540 | 6/1975 | Protze et al. | 297/384 |
| 3,899,191 | 8/1975 | Royce | 280/150 |
| 3,967,851 | 7/1976 | Stier | 297/416 |
| 4,090,734 * | 5/1978 | Inami et al. | 196/146.6 |
| 4,159,145 | 6/1979 | Quakenbush | 297/113 |
| 4,230,414 | 10/1980 | Cheshire | 403/95 |
| 4,300,315 * | 11/1981 | Holzwarth | 49/502 |
| 4,307,911 * | 12/1981 | Pavlik | 296/188 |
| 4,323,278 | 4/1982 | Sukopp et al. | 297/481 |
| 4,372,580 | 2/1983 | Motonami et al. | 280/802 |
| 4,415,195 | 11/1983 | Furukawa et al. | |
| 4,600,217 | 7/1986 | Naumann et al. | 280/808 |
| 4,642,941 | 2/1987 | Staran et al. | 49/352 |
| 4,668,010 | 5/1987 | Fujiwara | 297/150 |
| 4,750,779 | 6/1988 | Van Rooij | 296/188 |
| 4,769,951 * | 9/1988 | Kaaden | 49/502 |
| 4,793,099 | 12/1988 | Friese et al. | 49/380 |
| 4,801,172 | 1/1989 | Townsend | 296/155 |
| 4,881,778 | 11/1989 | Stephenson et al. | 297/417 |
| 4,940,282 | 7/1990 | Townsend | 296/204 |
| 4,969,680 | 11/1990 | Shimoda | |
| 5,072,966 | 12/1991 | Nishitake et al. | 280/730 |
| 5,074,611 | 12/1991 | Newkirk | |
| 5,106,160 | 4/1992 | Nomura et al. | 297/417 |
| 5,112,079 | 5/1992 | Haland et al. | 280/730 |
| 5,137,325 | 8/1992 | Ohya | 296/146.6 |
| 5,172,790 | 12/1992 | Ishikawa et al. | 180/268 |
| 5,224,733 | 7/1993 | Simsic | 280/730 |
| 5,224,752 | 7/1993 | Marshall | |
| 5,251,931 | 10/1993 | Semchena et al. | 280/730 |
| 5,277,441 | 1/1994 | Sinnhuber | 280/730 R |
| 5,290,084 | 3/1994 | Sinnhuber | 296/68.1 |
| 5,297,841 | 3/1994 | Sleolecki | 296/146.6 |
| 5,306,067 | 4/1994 | Hull et al. | 296/146.6 |
| 5,316,336 | 5/1994 | Taguchi et al. | 280/730 A |
| 5,348,342 | 9/1994 | Haland et al. | 280/730 A |
| 5,364,157 | 11/1994 | Siedlecki | 296/146.6 |
| 5,378,036 | 1/1995 | Townsend | 276/155 |
| 5,398,453 * | 3/1995 | Heim et al. | 49/502 |
| 5,431,476 | 7/1995 | Torigaki | 296/188 |
| 5,466,032 * | 11/1995 | Clausen et al. | 296/188 |
| 5,518,290 | 5/1996 | Reinhard et al. | 296/146.6 |
| 5,524,960 | 6/1996 | Townsend | 296/155 |
| 5,605,371 | 2/1997 | Borchelt et al. | 296/188 |
| 1806716 | 11/1968 | (DE) | |
| 2038050 | 2/1972 | (DE) | 296/153 |
| 2045875 | 3/1972 | (DE) | 296/146.6 |
| 2364632 | 12/1973 | (DE) | |
| 3344707 | 6/1985 | (DE) | 297/411.32 |
| 3435678 | 6/1986 | (DE) | 297/481 |
| 3701419 | 7/1988 | (DE) | 297/378.11 |
| 3835163 * | 4/1990 | (DE) | 49/502 |
| 3934590 * | 4/1991 | (DE) | 49/502 |
| 4240416 | 12/1992 | (DE) | 296/146.6 |
| 42 40 416 | 9/1993 | (DE) | |
| 4221795 * | 1/1994 | (DE) | 296/146.5 |
| 4237584 * | 5/1994 | (DE) | 296/146.6 |
| 296 14 488 U | 11/1996 | (DE) | |
| 426648 * | 5/1991 | (EP) | 49/502 |
| 0 472 284 | 2/1992 | (EP) | |
| 493225 | 7/1992 | (EP) | |
| 961405 | 5/1950 | (FR) | 296/155 |
| 1026247 | 4/1952 | (FR) | 296/155 |
| 1013189 | 7/1952 | (FR) | 296/155 |
| 73938 | 10/1960 | (FR) | |
| 2478718 | 3/1981 | (FR) | 296/155 |
| 242592 | 6/1926 | (GB) | 296/207 |
| 1085891 | 10/1967 | (GB) | 296/155 |
| 1592155 | 7/1981 | (GB) | 296/155 |
| 613307 | 12/1960 | (IT) | 296/155 |
| 134326 * | 6/1987 | (JP) | 49/502 |
| 3-281455 | 12/1991 | (JP) | |
| 4-50052 | 2/1992 | (JP) | |
| 4-356246 | 9/1992 | (JP) | |
| WO 98 43842 | 10/1998 | (WO) | |
| WO 99 17947 | 4/1999 | (WO) | |

* cited by examiner

VEHICLE CLOSURE PANEL HAVING AN INTRUSION BEAM AS PRIMARY STRUCTURE

RELATED APPLICATIONS

The present application is a Continuation-in-Part of U.S. patent application Ser. No. 08/829,460, filed Mar. 28, 1997, entitled "Side Intrusion Beam with Four Points of Connection," now U.S. Pat. No. 5,908,216, which is a Continuation-in-Part of U.S. patent application Ser. No. 08/577,649, filed Dec. 22, 1995, issued as U.S. Pat. No. 5,806,917, on Sep. 15, 1998, entitled "Integrated Motor Vehicle Door and Chassis,". Applicant incorporates each of the applications herein by reference and claims priority of each of these earlier filed applications pursuant to 35 U.S.C. § 120.

FIELD OF THE INVENTION

The present invention relates to a motor vehicle chassis, and in particular to a side intrusion beam within a door which is structurally integrated with the chassis.

BACKGROUND OF THE INVENTION

It has been previously proposed to structurally integrate a vertically sliding door into a vehicle chassis. This Door And Chassis Integration Technology (DACIT) as applied to vertically sliding doors is disclosed in the following U.S. Patents issued to John A. Townsend, incorporated herein by reference: U.S. Pat. No. 4,801,172 issued Jan. 31, 1989; 4,940,282 issued Jul. 10, 1990; 5,378,036 issued Jan. 3, 1995; and patent application Ser. No. 08/328,124 filed Oct. 20, 1994.

In operation, when the vertically sliding door which is the subject of the above patents is closed, structural key members located on the edges of the door engage with mating receptacles in the door jambs. In this position, each key member and mating receptacle pair is able to transmit compressive, tensile and torsional forces between the door and the vehicle chassis. The gap in the vehicle chassis structure that is created by the door opening is bridged by the door when it is in the closed position. This integrated chassis system that exists when the doors of the vehicle are closed provides a much stiffer vehicle frame and more fully surrounds the vehicle occupants to protect them from front, rear and side impact. The last issued patent above also teaches the use of a single, flat, side intrusion beam spanning across the door to inhibit intrusion to the vehicle during a side impact collision.

In a manner similar to that above, it has also been proposed to apply DACIT to conventional hinged vehicle doors. This concept is taught by the present inventor in U.S. patent application Ser. No. 08/577,649, filed Dec. 22, 1995, incorporated herein by reference. That application also discloses the use of two horizontal beams that span between the structural connections located adjacent to the four corners of the door. However, since no structural framework is located across the central portion of the door, the vehicle occupants are not fully protected from side impact intrusion.

Another example of a prior are side intrusion beam is shown in U.S. Pat. No. 3,887,227 issued to Deckert on Jul. 3, 1975. This apparatus employs tension members within a vehicle door that are tied to opposite sides of the door opening when the door is closed. However, these tension members only transmit tensile forces and are not capable of transmitting compressive or torsional forces across the door openings, which would be needed to reduce structural deformation during a front or rear end collision. These tension members also only cover a narrow portion of the door opening. Therefore, they may be wedged upward or downward by an impinging vehicle and may only provide limited protection in some collisions.

The above prior art side intrusion beams do not curve outward or inward as they span across the doorway, they have flat cross-sections, and they do not cover a large portion of the door. The prior art provides limited protection from intrusion during a side impact collision. Using the construction features of the prior art to create a door with increased intrusion protection would yield a door having increased weight and cost. Increasing the weight of a moving door and the overall weight and cost of a vehicle is often an unacceptable option in vehicle manufacture, and therefore a lower level of side intrusion protection is chosen instead.

What is needed and is not provided by the prior art is a side intrusion beam that efficiently provides a high level of side intrusion protection without adding excess weight, cost, size or complexity to the vehicle door.

SUMMARY OF THE INVENTION

The present invention provides a side intrusion beam that overcomes the disadvantages of the prior art discussed above. The side intrusion beam can be used in conjunction with a vertically sliding door, a conventional hinged door, a horizontally sliding van door, a rear tailgate, or any other type of vehicle door panel in which it is desirable to inhibit inward deformation during a collision.

In accordance with one aspect of the present invention, a disengageable structural connection is located at each of the four corners of the door for structurally connecting the side intrusion beam to the main chassis of the vehicle when the door is closed. In the preferred embodiment, wedge shaped structural keys are located at the top and bottom of both the forward and rearward edges of a conventional hinged door, facing inward. Mating receptacles are positioned in the front and rear doorjambs facing outward towards the keys. When the door is closed, the keys engage the mating receptacles and form a tight fit therewith. The mating receptacles are structurally connected to the vehicle chassis, and the keys are structurally connected to side intrusion beam. Therefore, when the door is in a closed position, tensile, compressive, torsional and bending forces can be transmitted from the side intrusion beam to the chassis through the mating keys and receptacles. By taking advantage of the strength inherent in the vehicle chassis, the side impact beam can be made thinner and lighter than a beam that is not structurally tied to the vehicle chassis when the door is closed.

In accordance with another aspect of the present invention, the inventive side intrusion beam spans across essentially the entire door to interconnect the four disengageable structural connections. In the preferred embodiment, the side intrusion beam comprises a central portion in the middle of the door, four diagonal beams each interconnecting the central portion with one of the disengageable connections, front and rear vertical side beams each interconnecting adjacent connections, top and bottom horizontal beams each interconnecting adjacent connections, and two horizontal side beams each interconnecting the central portion with a mid-portion of one of the two vertical side beams. With this configuration, almost the entire portion of the door opening that is covered by the closed door is spanned by a structural framework that inhibits side intrusion. Collision forces that are received by the intrusion beam are distributed among the four disengageable structural connections.

In accordance with still another aspect of the present invention, a non-flat side intrusion beam is provided such that the beam has an increased resistance to bending without adding excess weight to the beam. In the preferred embodiment, each of the beams that make up the overall side intrusion beam have bends or curves along their length to produce a complex cross-section having a much greater overall depth than the thickness of the beam material. This allows for greater impact protection without adding weight to the vehicle door.

In accordance with yet another aspect of the present invention, an intrusion beam or frame having multiple members is formed from sheet metal stampings to create a single, unitary frame. In the preferred embodiment, the beam is formed by spot welding two stampings together. This type of construction yields much lower fabrication costs than if individual beams are constructed and then joined together. Holes in the sheet metal are punched out to reduce weight in areas that do not contribute much additional strength, and to provide access to other components located in the door. Alternatively, the side intrusion beam may be molded from carbon fiber or another strong, lightweight material to achieve additional weight savings.

In accordance with yet another aspect of the present invention, the side intrusion beam is arched either inward or outward to provide greater resistance to bending. In the preferred embodiment, the overall beam framework is arched outward both vertically and horizontally to form a dish-shape that is highly efficient structurally for its weight and size. This type of structure goes primarily into compression during a collision.

In accordance with yet another aspect of the present invention, the side intrusion beam is adapted to replace the inner panel of the door frame, for further reductions in weight, size, cost and complexity.

The present invention also provides a movable closure for selectively covering an opening in a vehicle comprising an outer frame having at least one frame member for defining an outer periphery and a central beam portion connected to the outer frame and including a plurality of outwardly extending arms, such that each arm has at least one distal end being connected to the outer frame. Also, an exterior panel is connected to and at least partially covers the outer frame. Ideally, the central beam portion is shaped to efficiently distribute impact forces to the surrounding vehicle body structure, with or without the use of structural keys and receptacles. Thus, use of structural keys and receptacles is optional. Moreover, the size, shape, strength and resistance to deformation of the intrusion frame will vary, depending on vehicle size and weight, to meet impact and structural design requirements.

The present invention also provides a door for selectively closing a vehicle opening comprising a door ring having a recess defined by a flange and a tubular impact intrusion frame located in the recess and positioned adjacent the flange. The impact intrusion frame includes an outer frame having at least one frame member for defining an outer periphery, a central beam portion is connected to the outer frame and includes a plurality of outwardly extending arms. Each arm has at least one distal end for connection to the outer frame and wherein the central beam portion includes first and second U-shaped elements each having two outwardly extending arms. The second U-shaped element is positioned in an inverted, overlapping orientation relative to the first U-shaped element. Also, an exterior panel is connected to and at least partially covers the outer frame.

Still further, the side intrusion frame of the present invention provides the primary structure for a door. The outer frame and the central beam portion are generally the same strength and resist deformation generally equally. The outer door ring, however, is a secondary structure that is not as strong and does not resist deformation as well as the intrusion frame. Thus, only an outer door skin and a non-structural interior trim panel are needed to complete the door assembly, thereby eliminating extra components that found in conventional doors. For example, no hinge reinforcing panels or inner skin are needed to construct the door according to the present invention. Further, the need for deep draw stamping of an inner skin is avoided, thereby saving manufacturing equipment costs. By having the side impact frame provide primary structure for the door, it is now possible to have "structural modularity" for vehicle doors, i.e. have a same basic door on different model vehicles. Non-structural, cosmetic differences between doors are provided by changing the shape or appearance of the outer door skin and/or the interior trim panel. Thus, crash testing would only need to be done on the basic door model since the outer door skin and inner trim panel are not relied upon for the overall structural integrity of the door. Thus, the present invention saves both weight and cost.

Additionally, the present invention provides "packaging modularity" or "modular assembly" because nearly all mechanical and electrical door accessory components can be attached to the side intrusion frame, including the optional secondary beam and window brace beam. Thus, a fully assembled door subassembly can be assembled including the side intrusion frame carrying window regulator mechanisms, motors, wiring, door locks and the like. The door subassembly can then be shipped to a vehicle assembly plant where it is assembled in a door ring and attached to an outer door skin and an inner trim panel. Alternatively, the fully assembled door subassembly could include the door ring, such that only an outer door skin and an inner trim panel would need to be attached at the vehicle assembly plant.

The present invention can be used for doors, lift gates, end gates, hoods, trunk lids, sunroofs, and other vehicle closure panels to provide a primary structural closure panel and improve intrusion resistance.

DETAILED DESCRIPTION OF THE PREFERRED EMBODIMENTS

Figure 1:
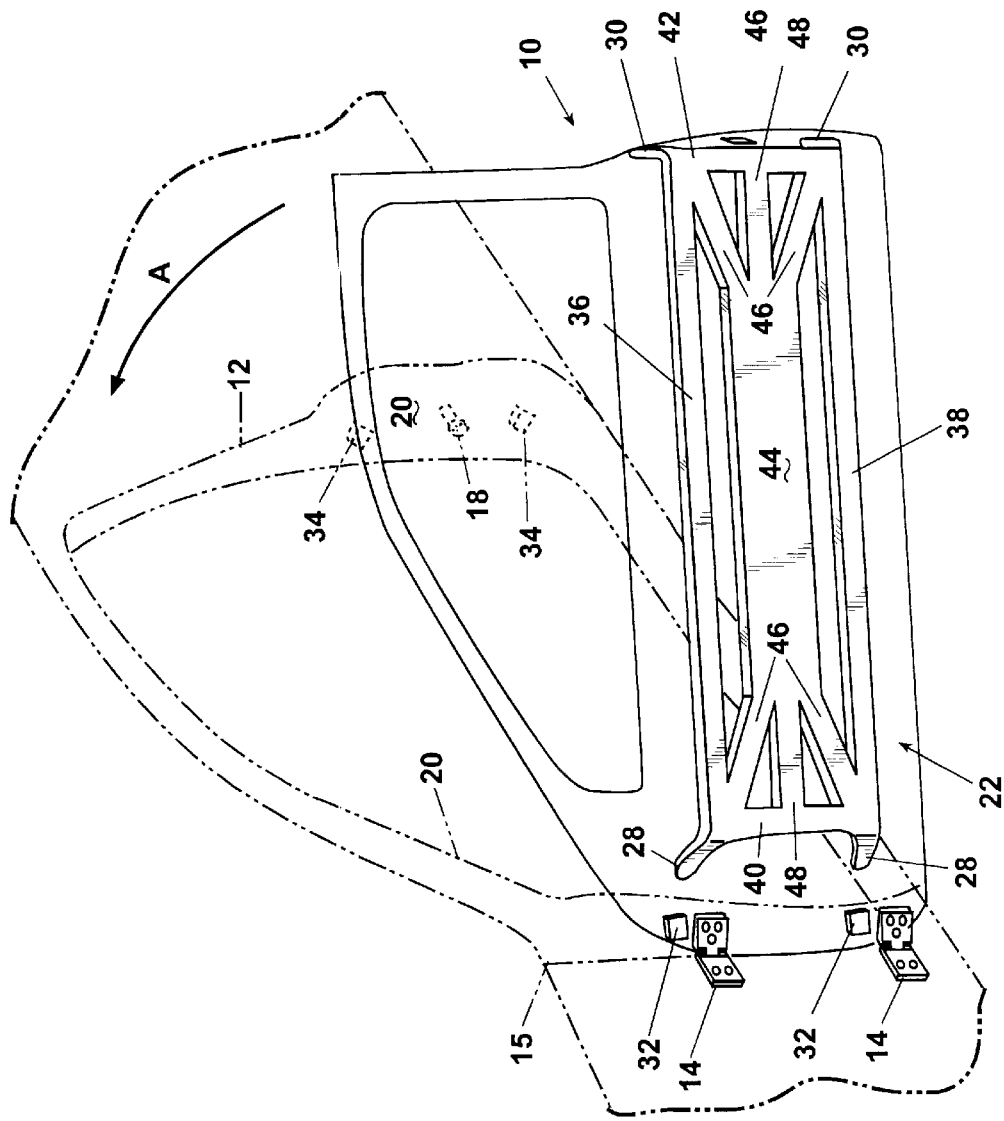
FIG. 1 is a perspective view schematically showing a general embodiment of the present invention applied to a conventional hinged, driver's-side vehicle door with the door shown in an open position.

Referring to FIG. 1, a general embodiment of the present invention is shown applied to a conventionally hinged door 10. Door 10 is pivotably connected to the vehicle body 12 by upper and lower hinges 14, and pivots about axis 15 which passes through hinges 14. Door 10 is shown in an open position and pivots about hinge axis 15 in the direction of Arrow A to a closed position. Door 10 is releasably held in the closed position by a conventional door catch 16 mounted on the rearward edge of door 12 which engages a post 18 mounted on the rear of door jamb 20.

Side intrusion beam or frame 22 is provided within door 10 to inhibit intrusion into the vehicle during a collision. Preferably, beam 22 covers as much of door 10 as possible, spanning between the four corners of the main portion of door 10.

Figure 2:
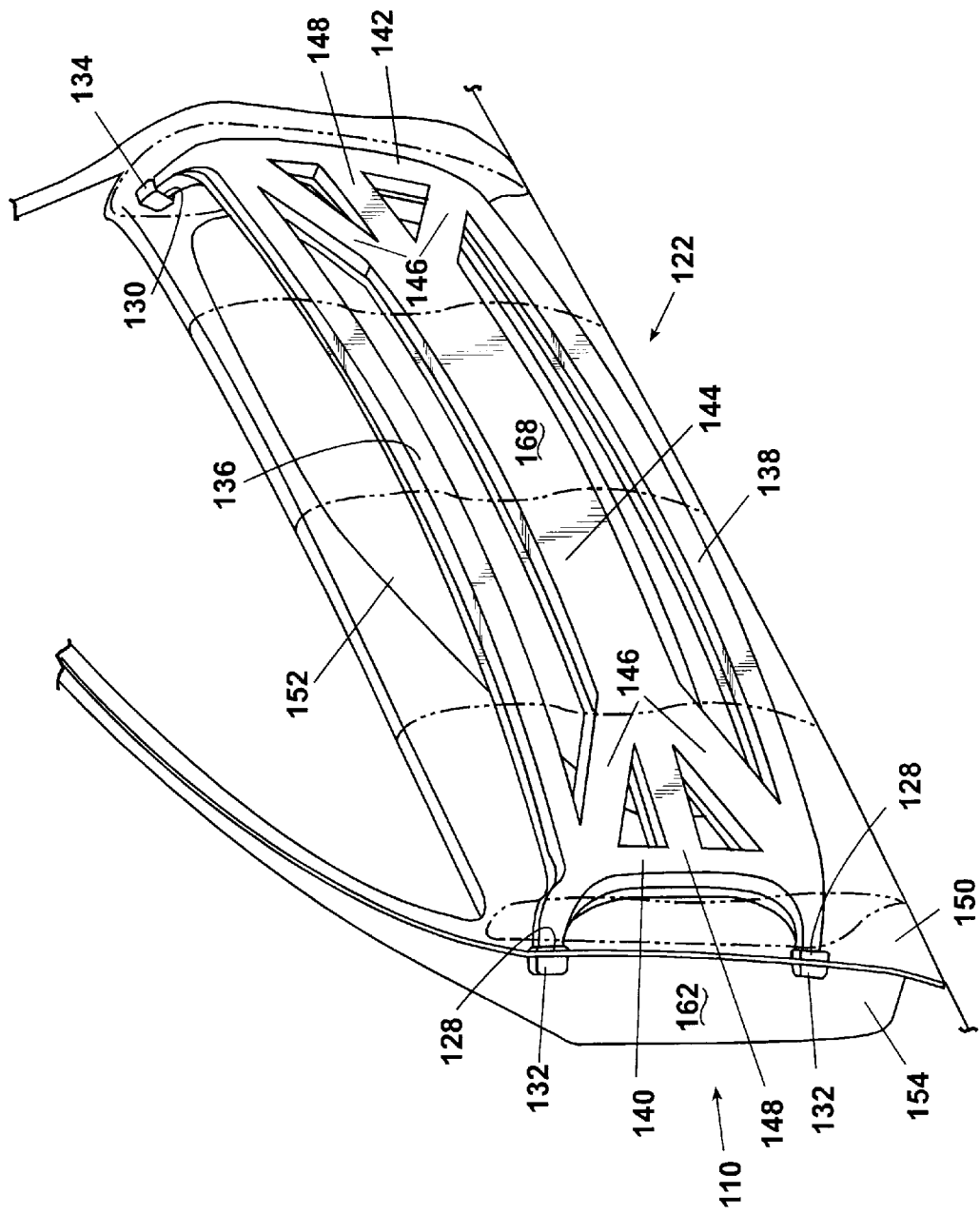
FIG. 2 is a perspective view showing a first embodiment of the invention with the door shown in the closed position.
Figure 3:
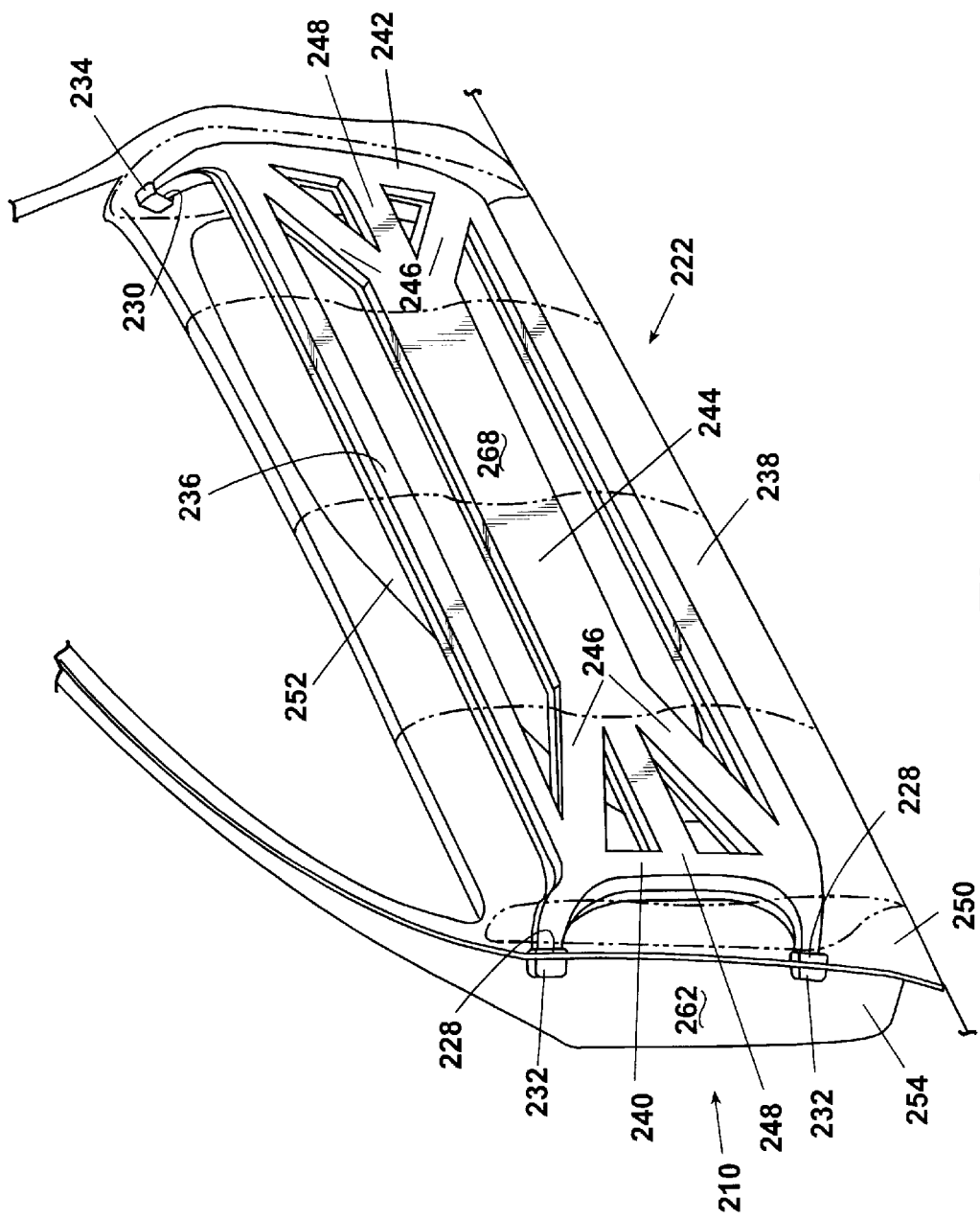
FIG. 3 is a perspective view showing a second embodiment with the door shown in the closed position.
Figure 4:
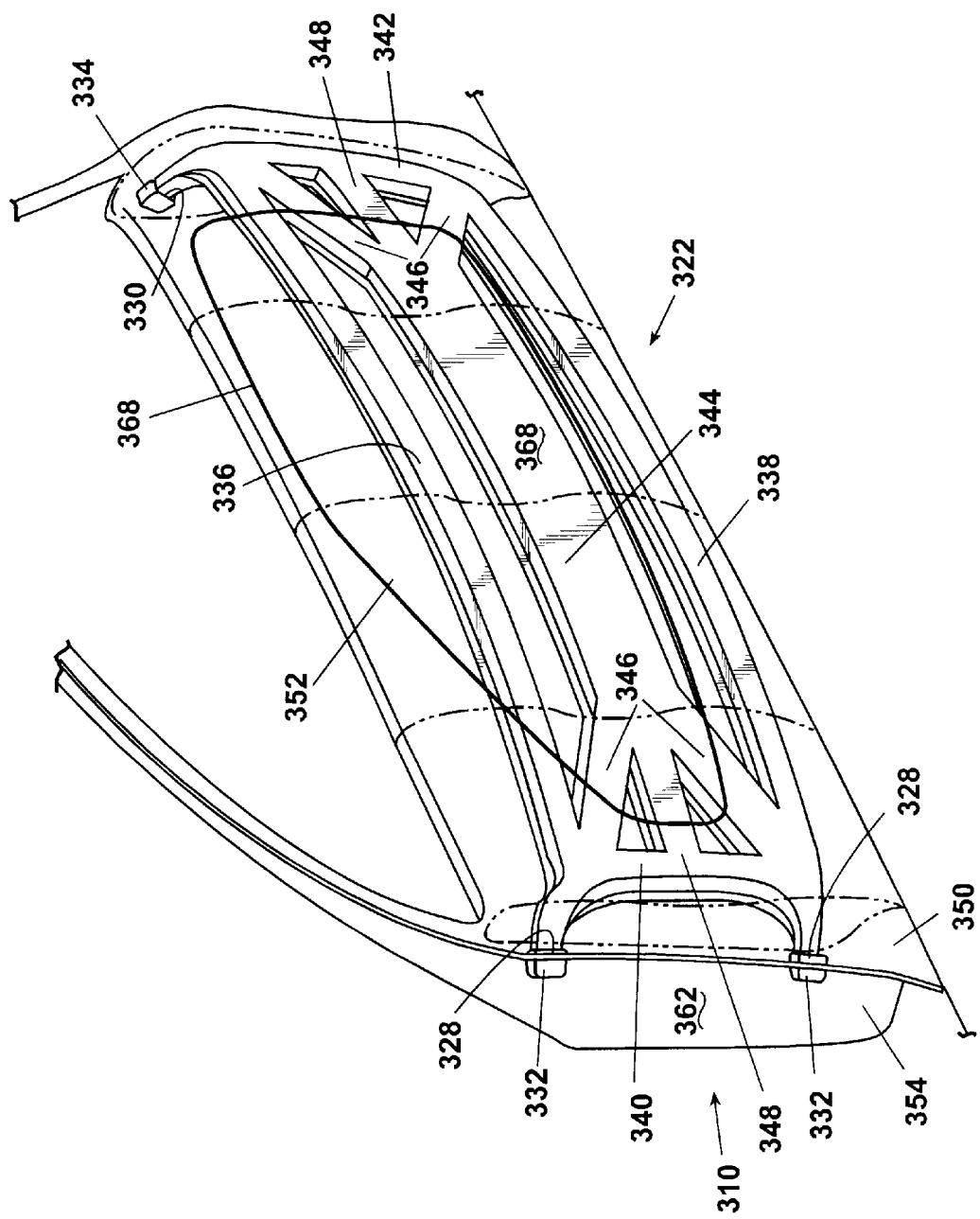
FIG. 4 is a perspective view showing a third embodiment with the door shown in the closed position.

The upper and lower front corners of beam 22 are provided with structural keys 28 projecting upward and inward toward the interior of vehicle body 12. Similarly, the upper and lower rear corners of beam 22 are also provided with rear structural keys 30 with similar orientations. Associated with each front structural key 28 is a mating front receptacle 32 located on the front portion of doorjamb 20 adjacent to each front key 28. Likewise, associated with each rear structural key 30 is a mating rear receptacle 34 located on the rear portion of door jamb 20 adjacent to each rear key 30. Receptacles 32 and 34 are positioned such that they receive keys 28 and 30, respectively, and form a tight fit therewith, when door 10 is closed, as shown in FIGS. 2 through 4. Front and rear receptacles 32 and 34 are rigidly connected into the structural chassis of vehicle body 12. This arrangement allows beam 22 to be structurally integrated with the structural framework of vehicle body 12 when door 10 is closed. Beam 22 can then withstand greater impact forces by transferring those forces to body 10 through structural keys 28 and 30 and mating receptacles 32 and 34 during a collision.

In the preferred embodiment, door 10 is raised as it approaches the fully closed position such that keys 28 and 30 travel up into receptacles 32 and 34, and hinges 14 separate to allow all loads to be transmitted from door 10 to body 12 through keys 28 and 30 and receptacles 32 and 34 rather than through hinges 14. This concept and its implementation are fully described in U.S. patent application Ser. No. 08/577,649, again incorporated herein by reference. Preferably, rather than have the entire door raise up upon closing, just the rear of door 10 is raised, as will later be described below.

In order to reduce the weight of intrusion beam 22, beam 22 can be made up of a plurality of truss members with gaps therebetween rather than being a continuous plate-like member. In the preferred embodiment, beam 22 consists of an upper horizontal member 36 connecting upper keys 28 and 30, a lower horizontal member 38 connecting lower keys 28 and 30, a forward vertical member 40 connecting forward keys 28, a rear vertical member 42 connecting rear keys 30, a central member 44, four diagonal members 46 each connecting central member 44 to one of the keys 28 and 30, and two side members 48 each connecting central member 44 to a mid-portion of one of the vertical members 40 and 42. In an alternative embodiment (not shown), side members 48 are omitted.

With the above arrangement, a lightweight yet strong structure is provided to span across the entire door to prevent vehicle passengers from side intrusion. Because intrusion beam 22 is structurally tied to the vehicle body 12, it is stronger, lighter and less bulky than conventional side intrusion beams, and it covers more area.

Referring to FIGS. 2, 3 and 4, three specific embodiments are shown with reference numerals incremented by 100, 200, and 300, respectively. The corresponding elements of the three embodiments are identified as follows:

| Element | FIG. 1 | FIG. 2 | FIG. 3 | FIG. 4 |
| --- | --- | --- | --- | --- |
| door | 10 | 110 | 210 | 310 |
| intrusion beam | 22 | 122 | 222 | 322 |
| front keys | 28 | 128 | 228 | 328 |
| rear keys | 30 | 130 | 230 | 330 |
| front receptacles | 32 | 132 | 232 | 332 |
| rear receptacles | 34 | 134 | 234 | 334 |
| upr. horiz. member | 36 | 136 | 236 | 336 |
| lwr. horiz. member | 38 | 138 | 238 | 338 |
| fwd. vert. member | 40 | 140 | 240 | 340 |
| rear vert. member | 42 | 142 | 242 | 342 |
| central member | 44 | 144 | 244 | 344 |
| diagonal members | 46 | 146 | 246 | 346 |
| side members | 48 | 148 | 248 | 348 |
| door outer skin | 50 | 150 | 250 | 350 |
| window | 52 | 152 | 252 | 352 |
| door inner shell | 54 | 154 | 254 | 354 |
| door inner surface | 62 | 162 | 262 | 362 |
| beam outer stamping | 68 | 168 | 268 | 368 |

In a first embodiment, shown in FIG. 2, intrusion beam 122 extends outward from keys 128 and 130 towards the outer skin 150 of door 110. Preferably, beam 122 is arched in both vertical and horizontal directions, yielding a beam 122 having its innermost points at the four corners and its outermost points at the center of central member 144. This outwardly arching shape provides an increased ability to resist inward deformation during a collision. In this embodiment, beam 122 occupies the space between retracted window 152 and outer door skin 150. The spaces between the truss members of beam 122 allow for the location and access of door components such as window drive and door lock mechanisms (not shown.)

Referring to FIG. 3, a second embodiment is shown. This embodiment is similar to the first with the intrusion beam 222 located outboard of window 252, but with beam 222 having a more planar shape. Such a shape may be necessitated by limited space between window 252 and door skin 250, or by other design or manufacturing constraints.

Referring to FIG. 4, a third embodiment is shown. In this embodiment, beam 322 has an arched shape and is located inboard of window 352. This embodiment is almost identical to the first embodiment shown in FIG. 2, except for the placement of the window. Such an arrangement might be necessitated by the geometry of a particular window path.

In an alternative embodiment (not shown), the intrusion beam could be arched inward to provide more strength than a flat beam. Preferably, beam 22 has as large an outward arch as possible and is located outboard as far as possible, such as in the first embodiment. This provides the strongest beam 22 possible. It also leaves as much room as possible between beam 22 and the passenger for locating energy absorbing material or for permitting beam 22 to deform inward somewhat to absorb some of the impact energy.

Figures 5, 6:
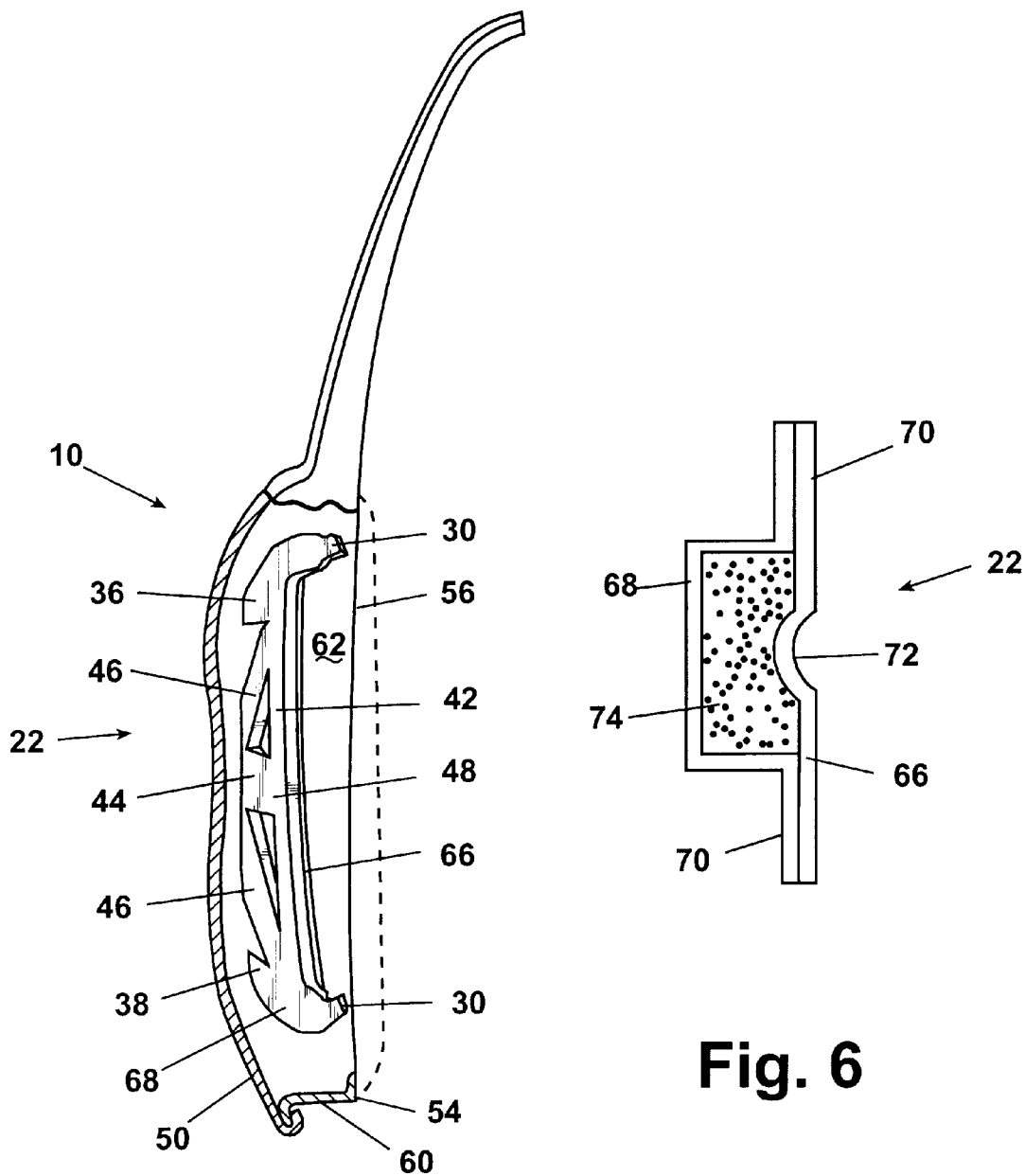
FIG. 5 is an end view showing the first embodiment with a portion of the trailing end of the door removed for clarity.
FIG. 6 is a cross-sectional view showing a typical section of the side intrusion beam.
Figure 7:
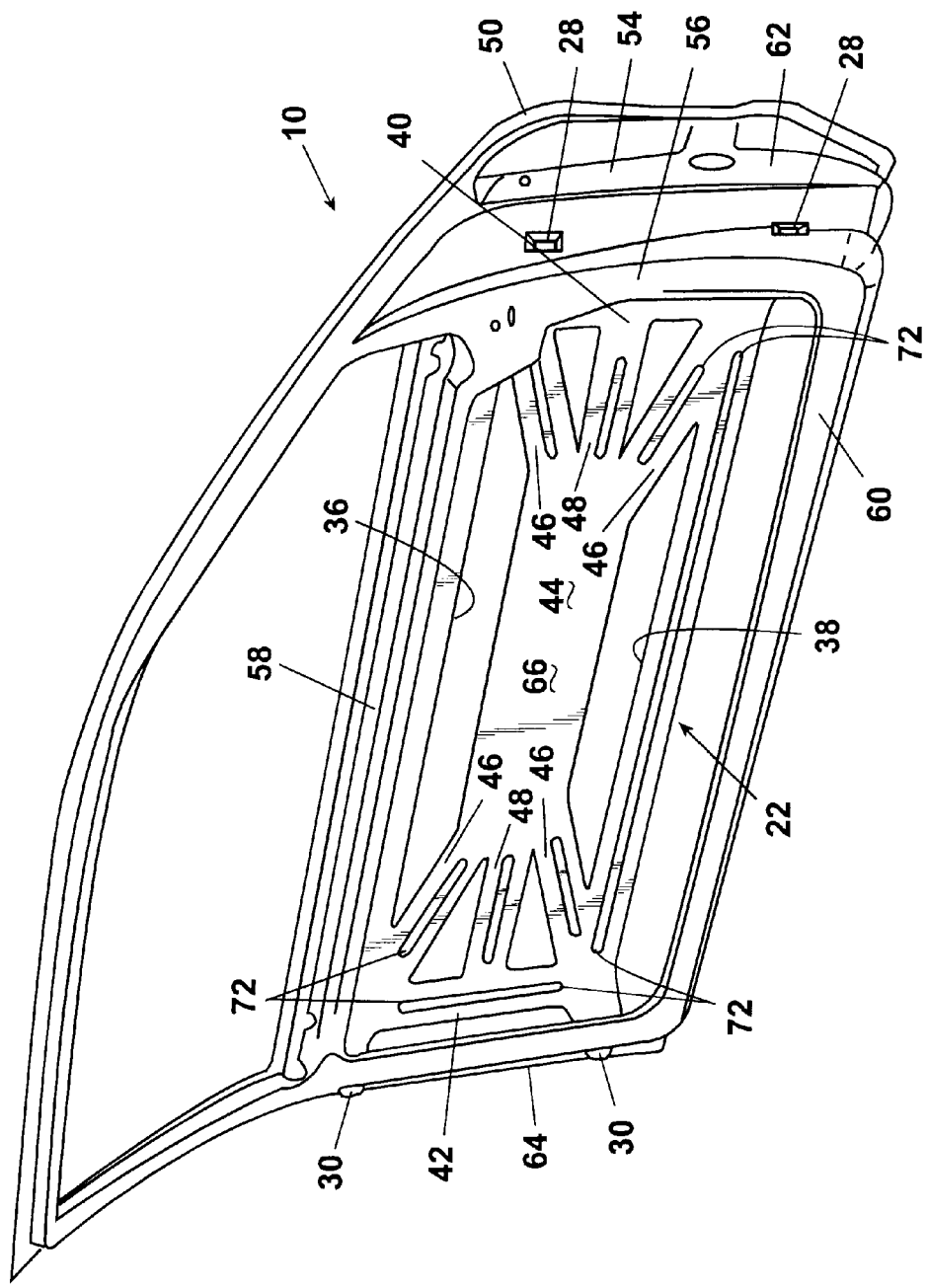
FIG. 7 is a perspective view showing the inboard side of the door and intrusion beam.

Referring to FIGS. 5 and 7, the construction of door 10 will be described. The overall structure of door 10 is of standard construction, having an outer skin 50 joined along its outer edges to an inner shell 54. Both outer skin 50 and inner shell 54 are sheet metal stampings, each with a cutout for receiving window 52 when extended in the closed position. Outer skin 50 is generally a curved sheet of steel which makes up the outer surface of door 10. The main portion of inner shell 54 is generally pan shaped and makes up the inside 56, top 58, bottom 60, front 62 and rear 64 surfaces of door 10. During assembly, the outer edges of skin 50 are bent around the outer edges of shell 54 and crimped to hold the two stampings 50 and 54 together.

On a conventional door, inside surface 56 spans across the entire inside of the door (with cutouts for door components), as depicted by the dashed line in FIG. 5. As shown in FIGS. 5 and 7, the present invention allows the majority of inside surface 56 to be omitted, leaving just a narrow edge around the border. Most of inside surface 56 can be omitted because intrusion beam 22 provides sufficient strength to replace this part of the door structure. The weight saved by omitting this portion of a conventional door offsets at least some of the weight added by installing intrusion beam 22. In fact, it is envisioned that the overall weight of door 10 designed to include side intrusion beam 22 will be less than that of a conventional door having a conventional tubular intrusion beam, and will clearly offer greater intrusion protection.

Door components (not shown) such as switches, door handle, window motor, upholstered panel, and the like can be mounted with bracketry or directly mounted to beam 22 or inner shell 54. The inside of door 10 may be filled with hardened foam for sound deadening and providing cushioning to the passenger for additional side impact protection.

As shown in FIG. 7, front keys 28 and rear keys 30 protrude through inner shell 54. During manufacture, keys 28 and 30 are attached to beam 22, as described below, which is then attached to door 10. Beam 22 can be attached to door 10 by being directly welded to inner shell 54, or removably connected with appropriate bracketry. Alternatively, beam 22 can be attached to inner shell 54 by welding keys 28 and 30 to inner shell 54. Whatever method is used to connect beam 22 to door 10, beam keys 28 and 30 are able to engage with and disengage from receptacles 32 and 34 when door 10 is closed and opened, respectively.

Referring to FIG. 6, the construction of intrusion beam 22 will be described. FIG. 6 shows a typical cross-section of beam 22, such as through the upper or lower horizontal members 36 and 38, the forward or rearward vertical members 40 and 42, or one of diagonal or side members 46 and 48, respectively. Preferably, beam 22 is constructed by joining two single sheet metal stampings: an inner stamping 66 and an outer stamping 68. Both stampings 66 and 68 preferably have a material thickness of about fifty-nine thousandths of an inch (0.059 in.) Both stampings are formed by removing cutouts between the portions that make up the truss members, bending each stamping 66 and 68 so that each truss member has a complex cross-section, and forming the entire stamping such that it has an overall arched shape. For added rigidity, channels 72 (shown also in FIG. 7) are formed in inner stamping 66 along the portions that make up the truss members. The two stampings 66 and 68 are then aligned and joined together with spot welds 70. The overall thickness of the two stampings when joined together is preferably about nine tenths of an inch (0.90). The voids between inner stamping 66 and outer stamping 68 can be injected with a light-weight, hardenable foam 74, as is well known in the art, to deaden sound and increase the bending strength of truss members 36 through 48.

Structural keys 28 and 30 can be made separately of solid material, such as of hardened steel, and then joined to the corners of intrusion beam 22, such as by welding. Alternatively, keys 28 and 30 can be created by forming them directly from stampings 66 and 68. With this latter fabrication process, welding and grinding would be performed on the structural key portions of stampings 66 and 68 to create smooth surfaces for mating with receptacles 32 and 34 (shown in FIG. 1.)

Alternate methods of constructing side intrusion beam 22 and/or structural keys 28 and 30 include, but are not limited to, using a single stamping, more than two stampings, using individual truss members fastened together, using carbon fiber, or using other advanced, high strength and light weight materials.

In all of the above embodiments, proper alignment between keys 28 and 30 and receptacles 32 and 34 can be achieved by accurately locating these members during vehicle manufacture, or by adjustably mounting beam 22 to door 10 and or adjustably mounting receptacles 32 and 34 to doorjamb 20. Alternatively, receptacles 32 and 34 can be formed by injecting a hardenable resin into an oversized shell mounted to doorjamb 20 when door 10 is closed and key 28 or 30 is protruding into the shell. This method is fully described in U.S. patent application Ser. No. 08/328,124, filed Oct. 20, 1994, incorporated herein by reference. Creating receptacles 32 and 34 in place by using a hardenable resin has the advantage of not only positioning receptacles 32 and 34 accurately with respect to keys 28 and 30, but also is a more cost effective and accurate way of manufacturing receptacles that fit the keys exactly. This is particularly appropriate for the front receptacles 32. Because these receptacles 32 are angled forward, tightly curved, are wedge shaped, and can be angled upward, they have a complex shape that is difficult to machine and position to make a tight fit with forward keys 28.

Figure 8:
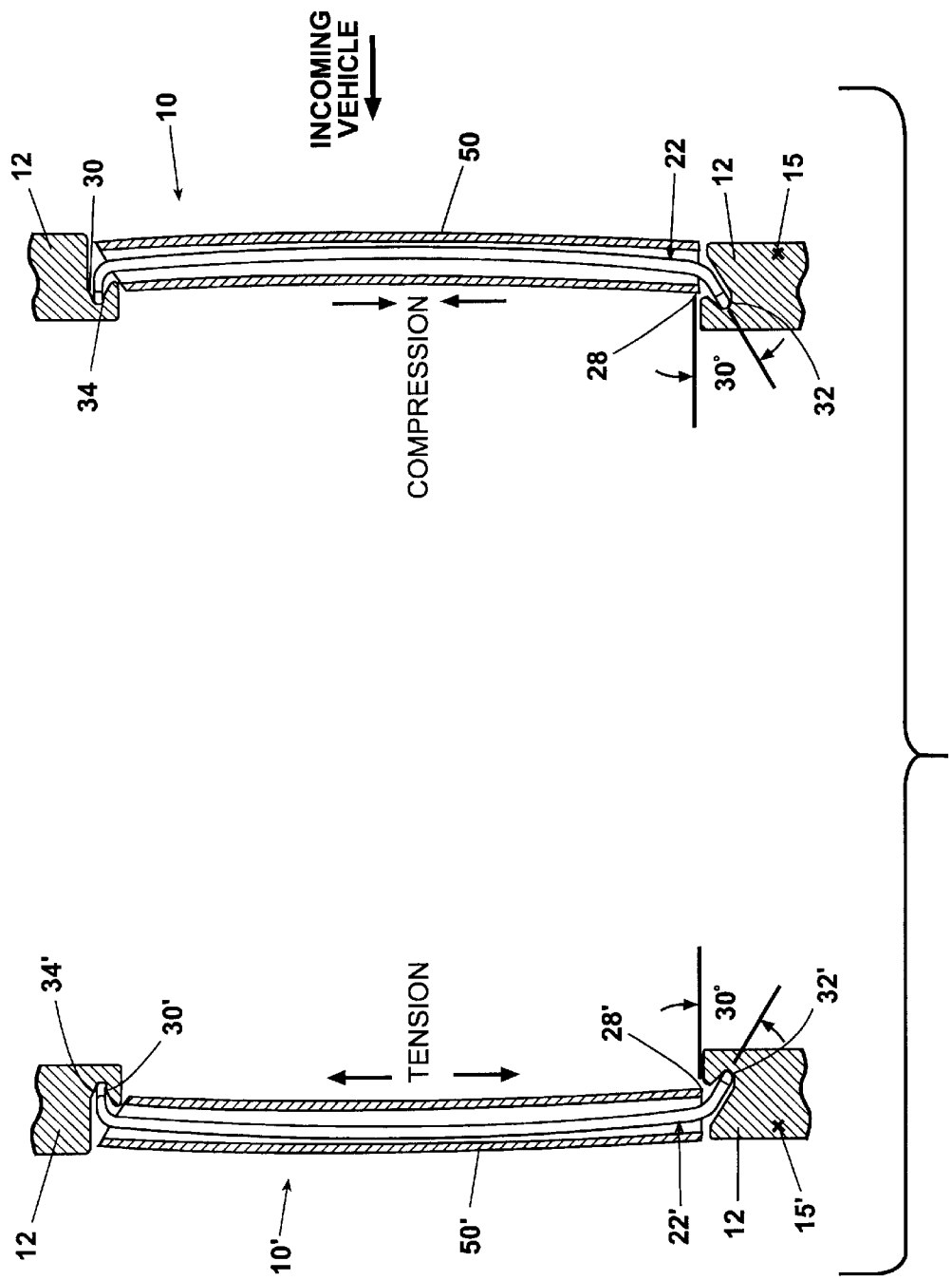
FIG. 8 is a top view schematically showing side intrusion beams in opposite doors (such as in a driver's door and a passenger's door.)

Referring to FIG. 8, the preferred orientation of keys 28 and 30 will be described. Ideally, keys 28 and 30 are not oriented directly inward toward the opposite side of the vehicle. If they were to be oriented directly inward, door hinges 14 and door catch 16 (shown in FIG. 1) would have to carry all of the load associated with holding keys 28 and 30 into receptacles 32 and 34. By orienting keys 28 and 30 so that they are not pointing directly inward, keys 28 and 30 are able to carry much of this outward load, which can be considerably high, especially during a collision. This allows hinges 14 and door catch 16 to carry very little or no load when door 10 is closed, which in turns eliminates undesirable bending moments placed on the load carrying keys 28 and 30, and on receptacles 32 and 34.

In the preferred embodiment, front keys 28 are angled forward 30 degrees from directly inward (as shown in FIG.

8), and rear keys 30 are angled upward 60 degrees from directly inward (as shown in FIG. 5.) In other words, each front key 28 lies in a horizontal plane, and the two rear keys 30 lie in a common vertical plane. These angled orientations give keys 28 and 30 the ability to resist forces that would otherwise move them outward. As mentioned previously above, U.S. patent application Ser. No. 08/577,649 describes these key orientation and force direction issues in more depth.

In order for keys 28 and 30 to properly engage with receptacles 32 and 34, respectively, when door 10 closes, keys 28 and 30 and receptacles 32 and 34 should be properly positioned with respect to hinge axis 15 (shown in FIG. 1.) In other words, each key 28 and 30 and each receptacle 32 and 34 should be lined up with the direction of door travel such that each is perpendicular to a radius drawn between hinge axis 15 and itself. Since in the preferred embodiment the front keys 28 and front receptacles 32 are oriented 30 degrees forward as described above, they should also be located 30 degrees inward with respect to hinge axis 15 when door 10 is closed. Similarly, rear keys 30 and rear receptacles 34 should be located directly rearward from hinge axis 15 since they are oriented directly inward when door 10 is closed and is viewed from above. In order for rear keys 30 to properly engage the upwardly inclined rear receptacles 34, the rear of door 10 should be lifted as door 10 approaches a fully closed position. Again, complete details on embodiments that illustrate how this is accomplished are fully described and shown in U.S. patent application Ser. No. 08/577,649.

As schematically shown in FIG. 8, intrusion beams are preferably located on both sides of the vehicle. Intrusion beam 22 is located on the driver's side of the vehicle while a similar beam 22', which is a mirror image of beam 22, is located on the passenger's side of the vehicle. Door 10', hinge axis 15', front key 28', rear key 30', front receptacle 32', rear receptacle 34', and outer door skin 50' all correspond to their mirror image counterparts located on the opposite side of the vehicle.

Most of the prior art side intrusion beams known to the applicant inhibit intrusion by being heavily constructed to resist bending. A few, like the present invention, tie the ends of the intrusion beam to opposite sides of the doorjamb (i.e. to the vehicle body/chassis structure). However, these prior art devices only go into tension during a side impact collision, and the connections to the chassis only transmit tensile forces from the intrusion beam to the vehicle chassis. In contrast, in the preferred embodiment of the present invention, the intrusion beam 22 within the door being impacted goes into compression to resist intrusion, while the intrusion beam 22' on the opposite side of the vehicle goes into tension, as shown in FIG. 8, to keep that door from separating from its door opening. This prevents the vehicle being hit from "wrapping around" the front end of the incoming vehicle. Because of the arched structure of intrusion beam 22 and the design of keys 28 and 30 and receptacles 32 25 and 34, compressive, tensile, and even torsional and bending forces can be withstood by beam 22 and transmitted to the vehicle chassis.

The positions of keys 28 and 30 and receptacles 32 and 34 may be interchanged if desired. In other words, door 10 may be structurally integrated with body 12 by locating keys 28 and 30 on doorjamb 20 and locating receptacles 32 and 34 on intrusion beam 22.

Figure 9:
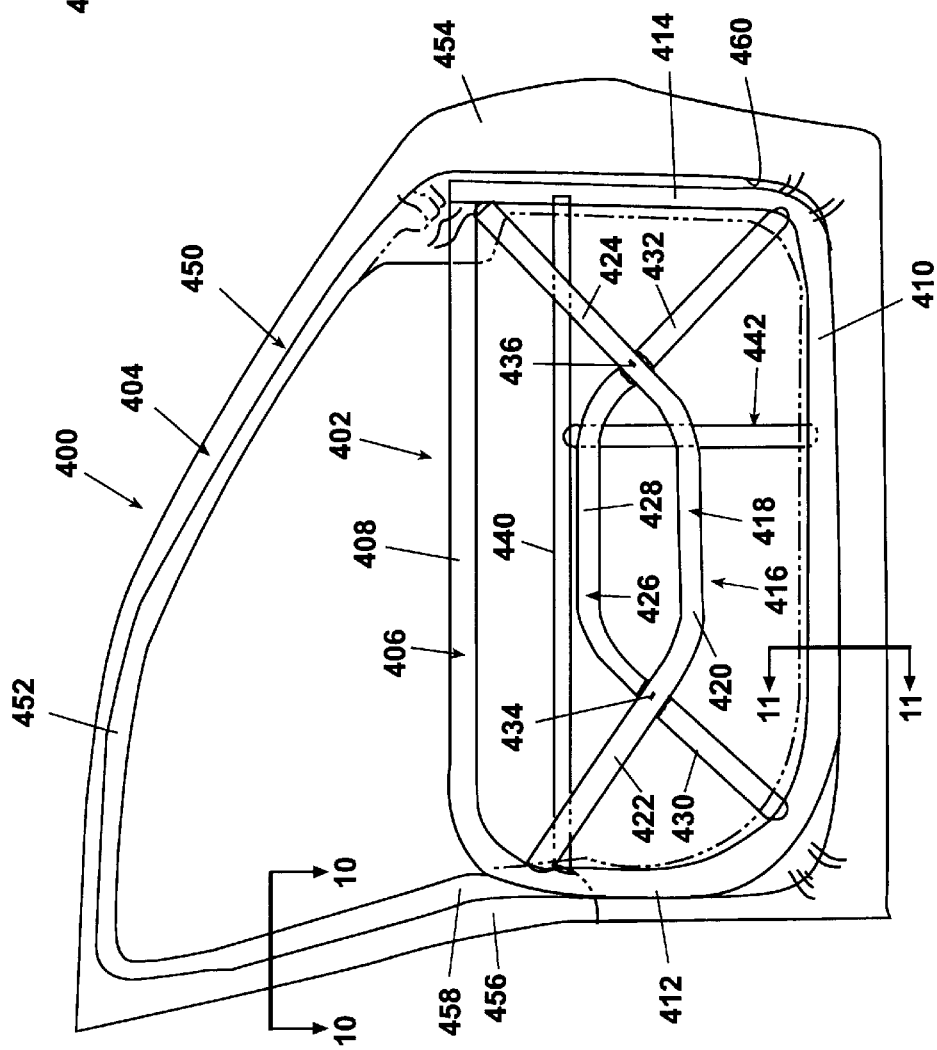
FIG. 9 is a perspective view of an alternate embodiment for the present invention.

FIG. 9 shows a door 400 having a side intrusion beam or frame 402 constructed in accordance with another embodiment of the present invention. In the illustrated embodiment, side intrusion frame 402 is mounted in a vehicle door shell 404. The view represents a typical passenger car right side door (passenger side) viewed from an exterior of a vehicle (not shown) with its outer door skin removed for clarity. However, the present invention can be readily adapted for use on any vehicle panel and is not limited only to doors. Side intrusion frame 402 includes a generally rectangular outer frame 406 having spaced apart upper and lower horizontal members 408, 410 connected to laterally spaced apart vertical members 412, 414. In the figure the four member are integral, but they may also be discrete and connected to one another as known in the art.

A central beam portion 416 is provided having a first generally U-shaped element 418 including a base 420 and first and second upwardly and outwardly extending arms 422, 424. Distal ends of each arm 422, 424 connect to respective predetermined locations on an upper half of generally rectangular frame 406. A second generally U-shaped element 426 is inverted and connected to first U-shaped element 418. Second U-shaped element 426 includes a base 428 and a pair of downwardly and outwardly extending arms 430, 432. Respective ends of arms 430, 432 are connected to predetermined locations on a lower half of outer frame 406, adjacent corners thereof.

First and second U-shaped elements 418, 426 intersect each other at first and second nodes 434, 436. In particular, first upwardly extending arm 422 is joined to first downwardly extending arm 430 at node 434. Similarly, second upwardly extending arm 424 is joined to downwardly extending arm 432 at node 436. Preferably a recess is formed in either one or both of first and second U-shaped elements 418, 426 at locations corresponding to nodes 434, 436 to allow nesting first and second U-shaped elements 418, 426 together in a same general plane. The recesses can be cut-outs or depressions, depending on the type of forming techniques that are used and the cross-sectional shape of elements 418, 426. Subsequently, first and second U-shaped elements 418, 426 can be joined using any suitable technique. Joining first and second U-shaped elements 418, 426 adds further structural rigidity to side intrusion frame 402. The arms diverge outwardly from the nodes and attach to generally rectangular outer frame 406 adjacent its corners. Each of the side intrusion frame elements can be formed from a tubular construction having any suitable shape including, but not limited to, round, square, or rectangular. Connections between elements, such as at nodes 434, 436, can be made using any suitable joining technique including welding, adhesive, or fasteners. Alternatively, side intrusion frame 402 can be stamped, extruded, or hydroformed. In addition, side intrusion frame 402 may have an overall planar shape, or alternatively have selected curvature to provide a concave shape, convex shape, or combination of shapes depending on a desired door shape and space requirements. As discussed above, when using a convex shape, side intrusion frame 402 is placed in compression when impacted by a collision force and provides increased resistance to inward deformation.

Optionally, but preferably, a secondary beam 440 extends horizontally and connects at its distal ends with vertical frame elements 412, 414. Secondary beam 440 provides increased structural rigidity and can be located on either an exterior or interior side of door 400. The illustrated embodiment shows secondary beam 440 on the interior side of door 400. Secondary beam 440 also provides additional structure upon which to mount mechanical and electrical door accessory components. A further benefit of secondary beam 440 is the additional crush zone that it creates between central beam portion 416 and an interior of a vehicle, where a passenger may be located, during a crash. A generally vertical window brace beam 442 extends between secondary beam 440 and lower frame element 410. Window brace beam 442 and secondary beam 440 may be connected using a suitable joining technique including, for example, welding, adhesive, or mechanical fasteners. Additionally, secondary beam 440 and window brace beam 442 can be tubular elements, stamped elements, or extruded elements. In the illustrated embodiment secondary beam 440 is located above second U-shaped member 426 and is spaced from upper frame member 408 approximately one-fourth of the overall length of vertical frame members 412, 414.

The embodiment shown in FIG. 9 is designed to effectively absorb side impact collisions from different size vehicles. For example, base 420 of U-shaped member 418 is positioned in a lower half of outer frame 406 at a height that is consistent with the height of a typical passenger car bumper. Similarly, base 428 of second U-shaped beam 426 is located in an upper half of frame 406 and generally corresponds with the height of a bumper on a taller vehicle, such as a truck, sport utility vehicle, or pick-up truck. Therefore, the present embodiment efficiently distributes collision energy during side impact collisions with vehicles having a variety of different sizes.

FIG. 9 also shows an outer door ring 450 that defines the outermost perimeter of door 400. Door ring 450 can have a simplified Z-shaped cross-sectional profile and be stamped from a suitable material, such as steel. Door ring 450 can subsequently be hemmed to a vehicle door outer skin (not shown). An upper window ring portion 452 flares smoothly into a lower door ring section 454 to form door ring 450. Also, door ring 450 has an outer ring lip 456 that connects to an inner ring lip 458 and defines a shoulder or recess 460 into which side intrusion frame 402 is positioned before attachment of an outer skin. Side impact frame 402 is designed to mate within a generally lower half of door ring 450.

In addition, the present embodiment provides a rectangular frame 406 with a central beam portion 416 having four points of contact, namely, adjacent respective corners of outer frame 406. Additionally, there are two connection points or nodes 434, 436 between first and second U-shaped members 418, 426 to efficiently transfer and absorb impact energy.

Figure 10:
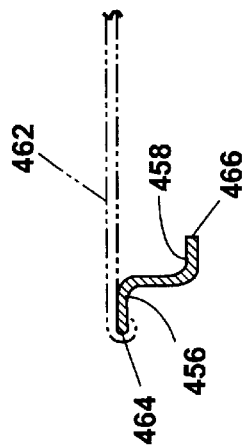
FIGS. 10 and 11 show cross-sectional views taken along lines 10—10 and 11—11 of FIG. 9.
Figure 11:
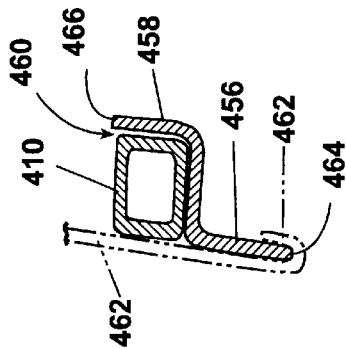

Another variation of the present embodiment includes providing a crushable material between an outer door skin, shown in phantom as element 462 in FIGS. 10 and 11, and side intrusion frame 402. Alternatively, crushable material can be added between side intrusion frame 402 and an interior trim panel (not shown). The crushable material can take the form of foam, honeycomb shaped members, or any other suitable crushable material that absorbs energy when compressed. Although not illustrated, the present embodiment can be used with or without DACIT system connections previously described above.

In the present invention, side intrusion frame 402 provides the primary structure for door 400. Outer frame 406 and central beam portion 416 have generally the same strength and resistance to deformation. However, door ring 450 is a secondary structure that is not as strong as intrusion frame 402 and does not resist deformation as well as intrusion frame 402. Further, only an outer door skin and a non-structural interior trim panel are needed to complete the door assembly. Intrusion frame 402 is also stronger and resists deformation better than the outer door skin and the interior trim panel.

Further, the present invention eliminates extra components that are typically found in conventional doors. For example, no hinge reinforcing panels or inner skin are needed to construct the door according to the present invention. Further, the need for deep draw stamping of an inner skin is avoided, thereby saving manufacturing equipment costs. By having side intrusion frame 402 provide primary structure for the door, it is now possible to have "structural modularity" for vehicle doors, i.e., have a same basic door on different model vehicles. Non-structural, cosmetic differences between doors are provided by changing the shape or appearance of the outer door skin and/or the interior trim panel. Thus, crash testing would only need to be done on the basic door model since the outer door skin and inner trim panel are not relied upon for the overall structural integrity of the door. Thus, the present invention saves both weight and cost.

Further, the present invention provides "packaging modularity" or "modular assembly" because nearly all mechanical and electrical door accessory components can be attached to the side intrusion frame 402, including optional secondary beam 440 and window brace beam 442. Thus, a filly assembled door subassembly can be assembled including side intrusion frame 402 carrying window regulator mechanisms, motors, wiring, door locks and the like. The door subassembly can then be shipped to a vehicle assembly plant where it is assembled in a door ring and attached to an outer door skin and an inner trim panel. Alternatively, the fully assembled door subassembly could include the door ring, such that only an outer door skin and an inner trim panel would need to be attached at the vehicle assembly plant.

FIG. 10 shows a partial cross-sectional view of an outer skin 462 hemmed over door ring 450 at an outer periphery 464 of outer lip 456. FIG. 10 also shows the generally Z-shape of door ring 450 including outer ring lip 456 being integral with inner ring lip 458. Inner ring lip 458 further includes an inner periphery 466.

FIG. 11 shows a cross-sectional view taken along line 11—11 of FIG. 9. In the illustrated embodiment, horizontal beam 410 is shown having a generally rectangular tubular cross-section and is captured between outer door skin 462 and inner ring lip 458. Capturing intrusion frame 402 within door ring 450 and outer skin 462 provides additional rigidity and support to increase absorbtion of impact energy and efficiently distribute forces. Lower horizontal beam 410 is effectively received in recess 460 prior to attachment of door skin 462. Additionally, although inner ring lip 458 is illustrated as extending approximately the same height as beam 410, it is also envisioned to shorten or lengthen inner ring lip 458 as required by a given design.

The preferred process for forming tubular frame members is hydroforming. Hydroforming allows side impact frame 402 to be accurately formed to predetermined dimensions and cross-sectional shapes. Predetermined shapes include, but are not limited to, rectangular, round, square, triangular, hexagonal, or oval cross-sections. However, both symmetrical and asymmetrical cross-sectional shapes are envisioned. More specifically, flattened areas can be provided to facilitate mounting of other frame members, hinges, hinge plates, latches, windows and other mechanical or electrical assembly components. Further, the selected shape of the side impact frame 402 can closely resemble the general profile and shape of recess 460 in door ring 450 to closely align and tightly nest impact frame 402 in recess 460, thereby simplifying alignment and assembly. Also, outer skin 462 can be secured to door ring 450 and/or side impact frame 402 using any suitable attachment technique including, for example, spot welding or adhesive bonding.

Figures 12, 13:
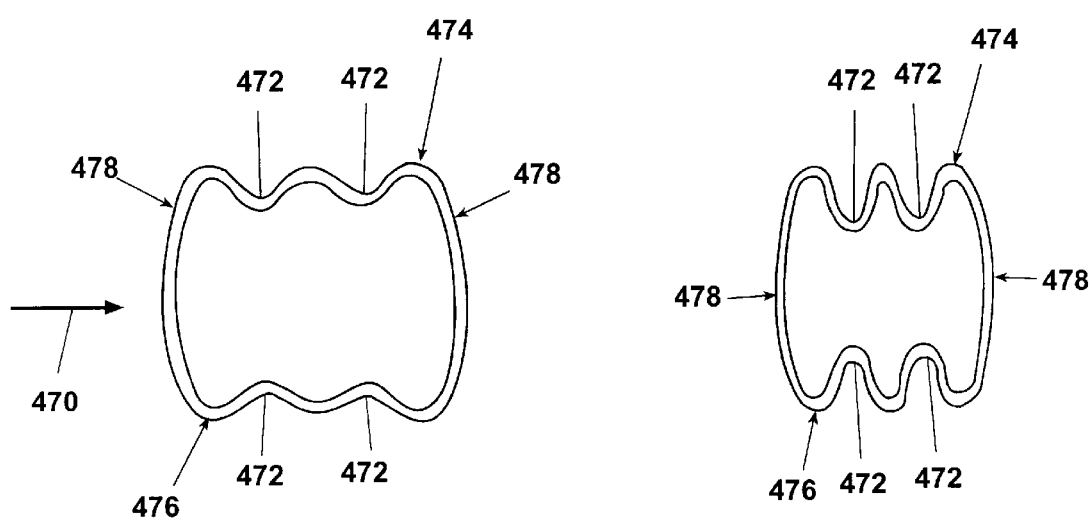
FIGS. 12 and 13 show an alternate cross-sectional shape for side intrusion beam frame elements.

FIGS. 12 and 13 show an alternate cross-sectional shape for one or more of the frame members in impact frame 402. A cross-sectional shape is selected to absorb impact energy from a side collision indicated by arrow 470 and shown in a collapsed mode in FIG. 13. One or more dimples 472 can be provided along a top wall 474 or bottom wall 476 of a frame member to resist tearing and allow continued collapsing of side impact frame 402. Top wall 474 is connected to bottom wall 476 by side walls 478. In the illustrated embodiment, two sets of spaced apart dimples 472 are located in each of the top and bottom walls 474, 476 creating a generally sinusoidal shape. Further, walls 474, 476 and 478 are integral. As shown in FIG. 13, dimples 472 tend to fold and collapse upon sufficient impact indicated by arrow 470, thereby absorbing greater energy than a standard rectangular cross-section.

Figure 14:
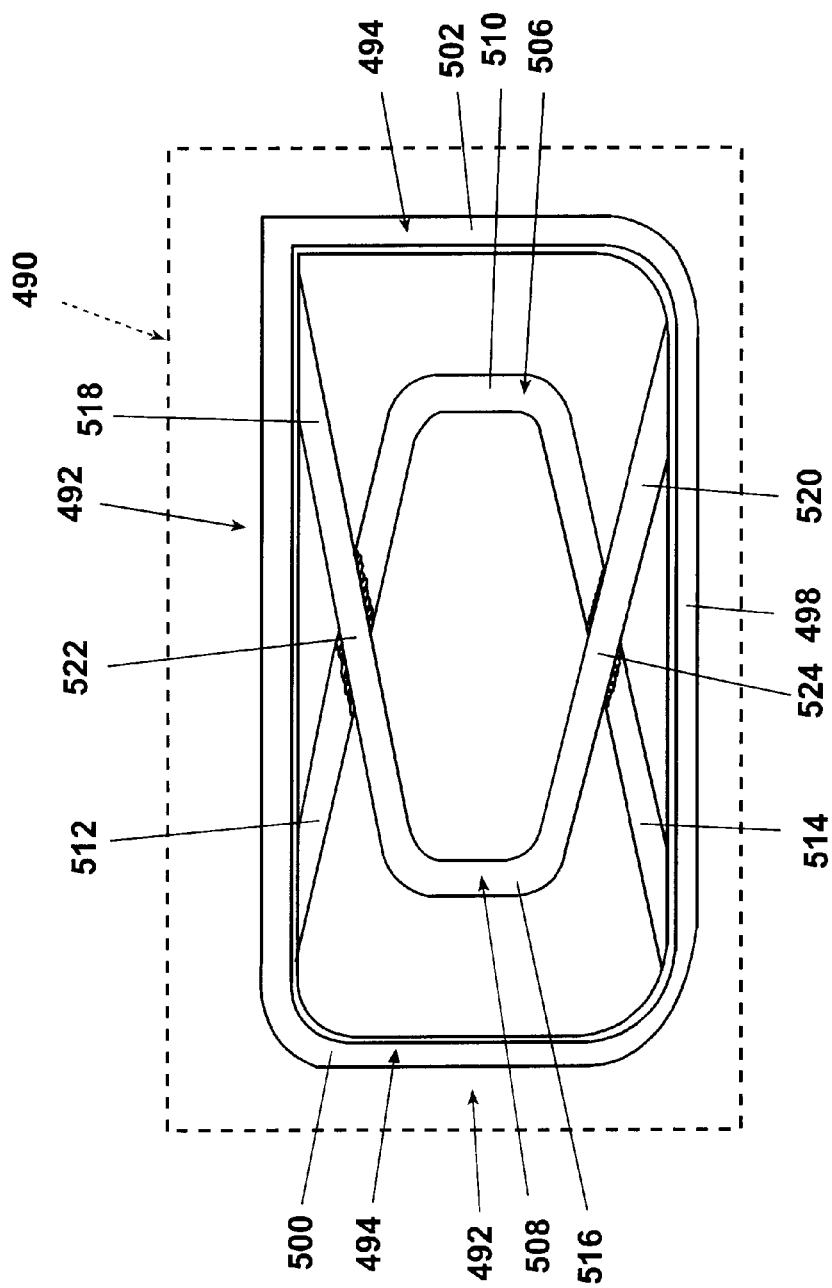
FIG. 14 shows an alternate embodiment of the present invention.

FIG. 14 shows an alternative embodiment of the present invention having some of the same features of the FIG. 9 embodiment. However, the present embodiment can be used on any vehicle closure panel 590, including for example, doors, lift gates, end gates, hoods, trunk lids, sunroofs, and other vehicle closure panels. Accordingly, closure panel 490 is generally referred to by dotted lines to represent any kind of closure panel. Impact beam or frame 492 includes a generally rectangular outer frame 494 having upper and lower horizontal members 496, 498 connected to spaced apart generally vertical front and rear members 500, 502. As discussed with respect to FIG. 9, outer frame 494 can be formed from any suitable material and have any suitable shape. Preferably, outer frame 494 has a tubular construction to provide excellent impact resistance. Located in frame 494 is a central beam portion 504 including first and second generally U-shaped elements 506, 508. First U-shaped element 506 includes a base portion 510 disposed on a rearward half of intrusion frame 492 which connects upper and lower outwardly projecting arms 512, 514. Distal ends of each arm 512, 514 are attached to a forward half of outer frame 494 adjacent corners thereof In the illustrated embodiment, arms 512, 514 attach to upper and lower horizontal members 496, 498, respectively. Second U-shaped element 508 has a base 516 disposed on a forward half of side intrusion frame 492 which connects upper and lower outwardly projecting arms 518, 520. Second U-shaped element 508 is inverted relative to first U-shaped element 506 such that arms 518, 520 are attached to upper and lower horizontal members 496, 498 on a rearward half of outer frame 494. Thus, first and second U-shaped elements 506, 508 are disposed sideways in an overlapping opposing relation. Similar to the FIG. 9 embodiment, first and second U-shaped members 506, 508 are connected at nodes 522, 524. Nodes 522, 524 improve structural rigidity for side intrusion frame 492 and can be formed by any suitable joining technique including welding, adhesive bonding, or mechanical fastening. Recesses, including cut-outs and depressions, are preferably found at locations corresponding to nodes 522, 524 to allow nesting of intersecting arms 512, 518, 514, 520. Thus, intersecting arms 512, 518, 514, 520 can all lie within a same plane or curve for even greater resistance to deformation. As with any of the other embodiments of the present invention, intrusion frame 492 can be formed from members that are stamped, extruded, or hydroformed and have a generally planar shape, concave or convex shape, or any combination thereof Optionally, but preferably, a secondary beam (not shown), similar to secondary beam 440 in FIG. 9, is provided to add further rigidity and mounting options for door accessory components. A window brace beam (not shown), similar to window brace beam 442 of FIG. 9, can also be provided in side intrusion frame 492 in accordance with the present invention. Central beam portion 504 can be sized and shaped such that nodes 522, 524 are relatively close or relatively distant depending on the desired crash impact characteristics. Similarly, base portions 510, 516 can be located relatively far apart or close together depending on the desired crash impact results. Central beam portion 504 extends through a substantial portion of interior area defined by outer frame 494. Moreover, central beam portion 504 is able to absorb impacts on a forward half, rearward half, upper half and lower half of the lower door corresponding with outer frame 494. For example, if closure panel 590 is a side door, an impact at a forward half of the door can be initially absorbed by base portion 510 which transfers energy throughout first U-shaped member 506 and through first U-shaped member 508 via nodes 522, 524. Therefore, the present embodiment can efficiently distribute collision impact forces and improve the structural integrity of a door and improve its crash worthiness.

Figure 15:
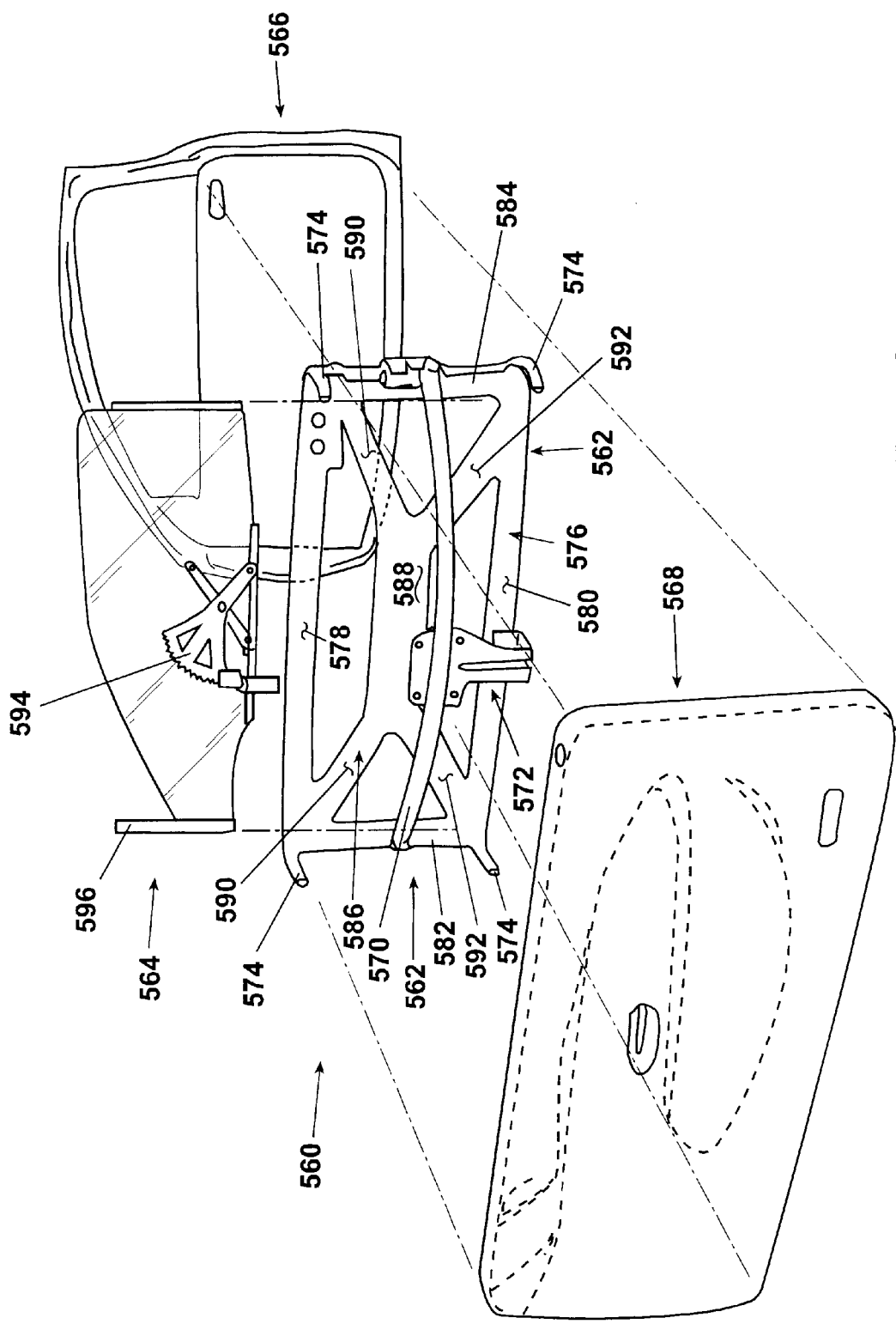
FIG. 15 shows an exploded view of yet another embodiment of the present invention.

FIG. 15 shows an exploded perspective view of vehicle front door assembly 560 including a side intrusion frame 562 that receives a window assembly 564. An outer door shell 566 and an inner trim panel 568 are adapted to be attached to side intrusion frame 562.

A horizontally extending secondary beam 570 is optionally attached to side intrusion frame 562 and may further include a generally vertical window brace beam 572.

Optionally, DACIT-type key interconnections 574 are provided to predetermined locations along the perimeter of side intrusion frame 562 to structurally integrate intrusion frame 562 with a vehicle body frame (not shown). When the door is closed, keys 574 are received within corresponding mating DACIT-type sockets (not shown) as described above that are mounted to the body frame. If a collision impact force strikes a side intrusion frame 562, keys 574 become integrated with corresponding receptacles (not shown) to interlock and efficiently transfer impact forces to the vehicle body frame reducing the amount of energy required to be distributed by side intrusion frame 562. In the preferred embodiment, wedge shaped structural keys are located at the top and bottom of both the forward and rearward edges of a conventional hinged door, facing inward. Mating receptacles are positioned in the front and rear door jambs facing outward towards the keys. When the door is closed, the keys engage the mating receptacles and form a tight fit therewith. The mating receptacles are structurally connected to the vehicle chassis, and the keys are structurally connected to side intrusion beam. Therefore, when the door is in a closed position, tensile, compressive, torsional and bending forces can be transmitted from the side intrusion beam to the chassis through the mating keys and receptacles. By taking advantage of the strength inherent in the vehicle chassis, the side impact beam can be made thinner and lighter than a beam that is not structurally tied to the vehicle chassis when the door is closed.

In the illustrated embodiment, side intrusion frame 562 includes a generally rectangular outer frame 576 that extends in both horizontal and vertical directions to encompass almost all of the lower two-thirds to one-half of the door shell 566, e.g., the non-window portion. Outer frame 576 includes upper and lower horizontal members 578, 580 connected to laterally spaced apart front and rear generally vertical members 582, 584. Located within outer frame 576 is a generally X-shaped central beam portion 586 having a generally horizontal central beam 588 connected at each of its distal ends with upper and lower diagonal arms 590, 592. Each diagonal arm 590, 592 extends outwardly and connects adjacent corners of outer frame 576. DACIT-keys 574 are connected adjacent each corner of outer frame 576 to receive impact forces transferred via central beam portion 586.

Secondary beam 570 provides increased resistance to side intrusion and acts as a backup when outer frame 576 and central beam portion 586 deflect under collision forces and contact secondary beam 570. Additionally, a window regulator 594 is mounted to secondary beam 570. Secondary beam 570 can be mounted to either an exterior side or an interior side of outer frame 576 and be substantially planar or curved in a concave or convex shape. Inward and outward curvature is generally preferred since it further promotes rigidity and intrusion resistance. In the illustrated embodiment, secondary beam 570 is mounted to central portions of front and rear vertical beams 582, 584 on an interior side of outer frame 576.

Figure 16:
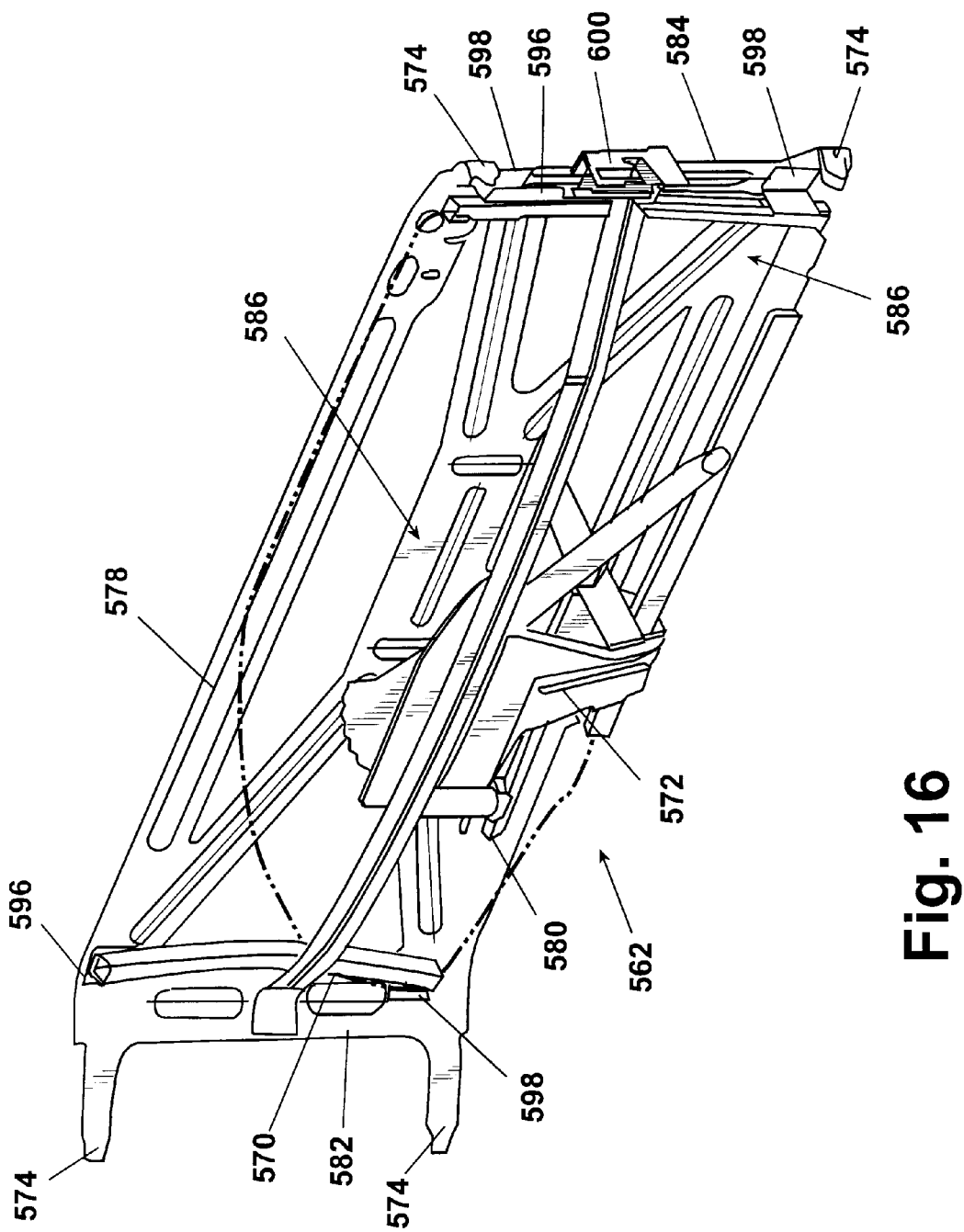
FIG. 16 shows a perspective view of a side intrusion beam frame according to the embodiment of FIG. 15.

Window assembly 564 can be of the conventional type and mounted to extend and retract relative to side intrusion frame 562. Component parts of window assembly 564 can be mounted to horizontal secondary beam 570 and/or window brace beam 572. In addition, a pair of window guide tracks 596 are shown in FIG. 16 with front and rear vertical beams 582, 584 each having a guide track 596 mounted thereon in a generally vertical orientation. Guide track 596 can be attached by using one or more guide brackets 598 which have a generally L-shaped cross-section. FIG. 16 also shows a door latch mechanism 600 attached to a central section of rear vertical beam 584.

Figure 17:
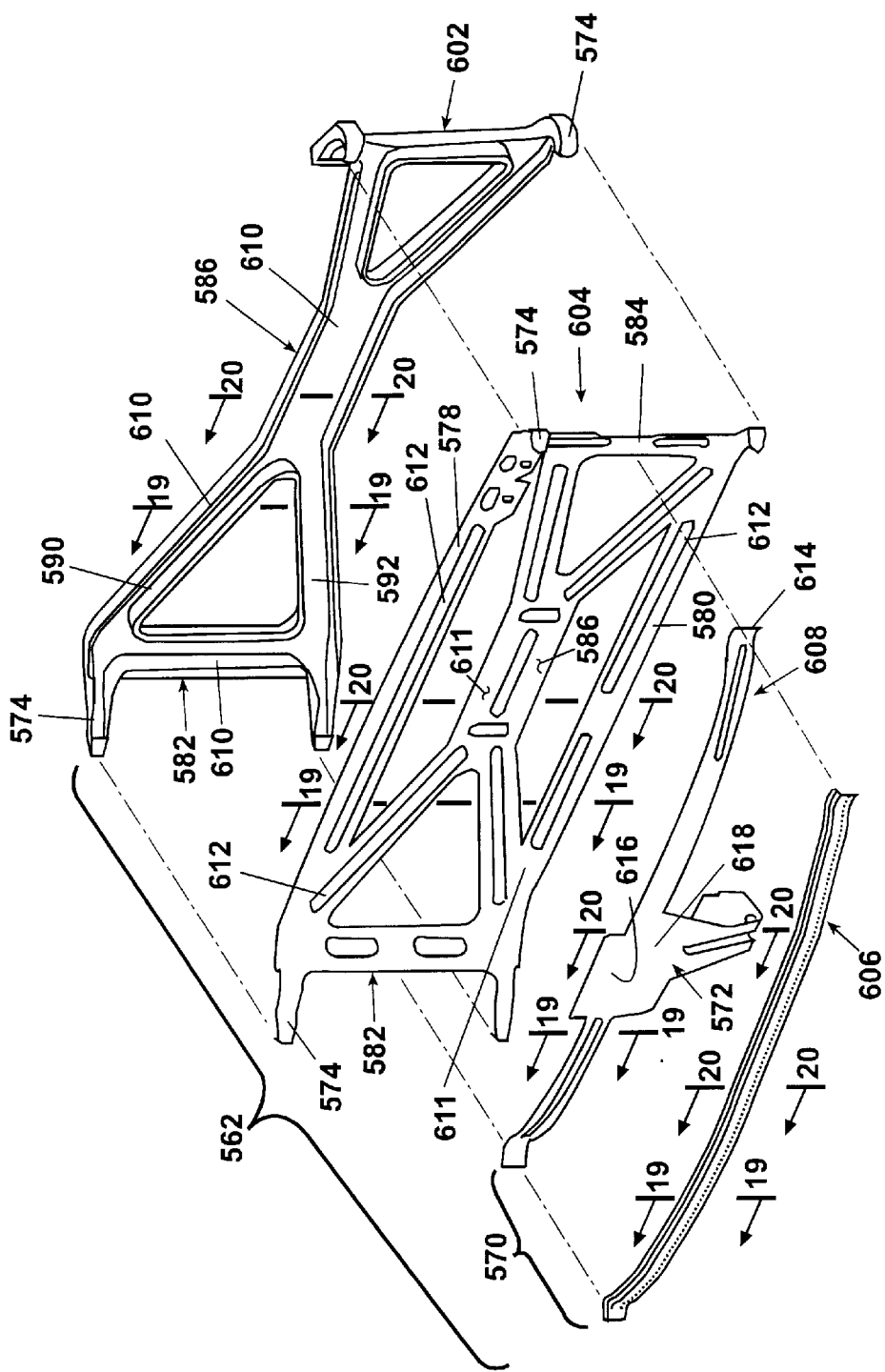
FIG. 17 shows an exploded view of the side intrusion beam frame of FIG. 16.

The side intrusion frame 562 of the present invention can be manufactured from a variety of suitable materials and by a variety of manufacturing techniques including stamped metals such as aluminum and steel (including stainless steel), hydroformed or welded tubing, or cured composites such as opoxy-graphite. FIGS. 17–20 illustrate one preferred embodiment of side intrusion frame 562 being fabricated from metal stampings which allows automotive component plants to manufacture and assemble side intrusion frame 562 using existing machinery. As shown in FIG. 17, the use of stamping as a manufacturing technique allows each element of side intrusion frame 562 to be formed with only two stampings 602, 604 that are joined using any suitable techniques (e.g., spot welding, interrupted seam welding, or mechanical fasteners). Optional secondary beam 570 can also be formed from two metal stampings 606, 608 that are subsequently joined to side intrusion frame 562 using any suitable joining technique including, for example, spot welding.

FIG. 17 shows an exploded perspective view of side intrusion frame 562 including first and second intrusion frame stampings 602, 604. First intrusion frame stamping 602 is a single-piece stamping of relatively deep cross-section and includes interconnected channel portions 610 corresponding to central beam portion 586 and front and rear generally vertical beams 582, 584. Further, optional DACIT-keys 574 can also be integrally stamped in first intrusion frame stamping 602.

Second intrusion frame stamping 604 is a single-piece stamping of relatively shallow cross-section and includes interconnected channel portions 611 corresponding to central beam portion 586, front and rear vertical members 582, 584, and upper and lower horizontal members 578, 580. Optionally, DACIT-keys 574 can also be integrally formed in second intrusion frame stamping 604. Optionally, but preferably, second intrusion frame stamping 604 further includes longitudinal dimple channels or stiffener grooves 612 formed along predetermined portions of one or more channel portions 611. Grooves 612 provide increased stiffness and resistance to buckling. Second intrusion frame stamping 604 is dimensioned to align with and at least partially engage first intrusion frame 602 forming a box-like cross-section. Secondary beam 570 is formed from first and second beam stampings 606, 608. First beam stamping 606 is a single-piece stamping of relatively deep cross-section. Second beam stamping 608 is a single-piece stamping of relatively shallow cross-section and has a generally longitudinally extending main body strap 614 that is dimensioned and shaped to engage first beam stamping 606 to form secondary beam 570. Second beam stamping 608 also includes a window brace beam 572 having an upwardly extending generally planar portion 616 and a downwardly extending J-shaped portion 618.

Figure 18:
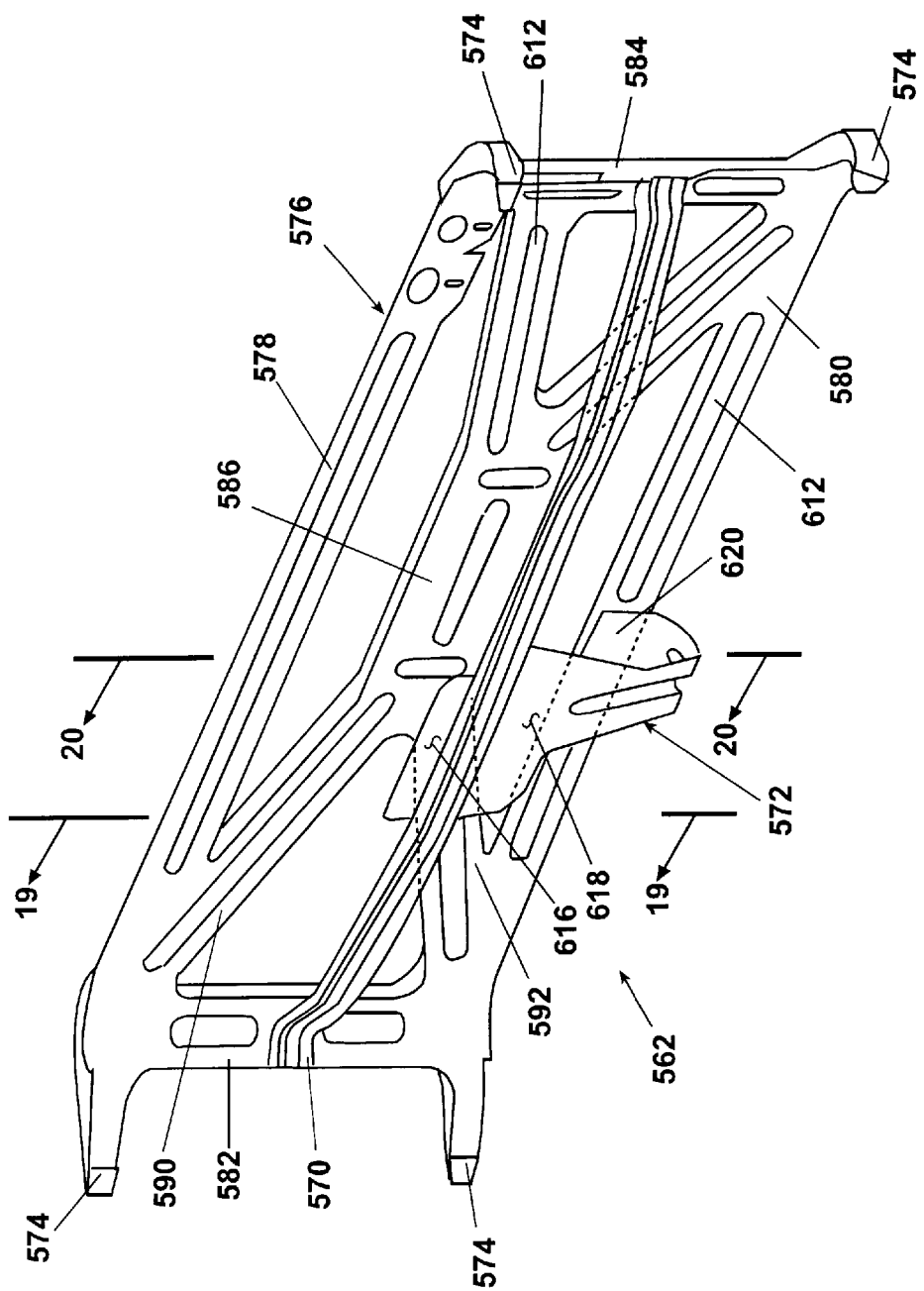
FIG. 18 shows a perspective view of the side intrusion beam frame of FIG. 17.

FIG. 18 shows a filly assembled intrusion frame 562. Distal ends of secondary beam 570 are connected to respective central portions of front and rear vertical beams 582, 584. Similarly, a distal end 620 of lower J-shaped portion 618 is connected to a central portion of lower horizontal beam 580. As discussed previously, any suitable joining technique can be used to connect respective stampings 602, 604, 606, 608 together. For example, bonding, spot welding, or mechanical fastening can be used.

Figure 19:
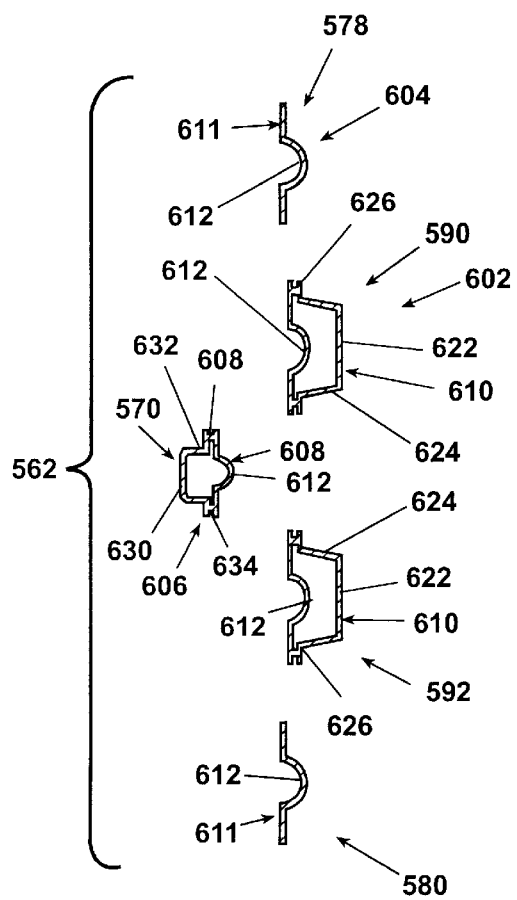
FIGS. 19 and 20 shows respective cross-sectional views taken along lines 19—19 and 20—20 in FIG. 18.

FIG. 19 is a cross-section view taken along line 19—19 of FIG. 18. First intrusion frame stamping 602 has relatively deep hat-shaped cross-sections, as represented by cross-sections of upper and lower diagonal arms 590, 592. The hat-shaped cross-section includes a base 622 connected to spaced apart side walls 624 that each have an outwardly extending rim flange 626 at the terminal end of each side wall 624. Second intrusion frame 604 has a generally planar cross-sectional shape which is selectively interrupted by arcuate stiffener grooves 612 located in a central region of channel portions 611. Where corresponding channel portions 610, 611 abut one another to form a beam element such as front upper diagonal arm 590, a box-like cross-section is formed by outer ends of channel portion 611 engaging rim flanges 626 of channel portions 610. As shown in FIG. 19, upper and lower diagonal arms 590, 592 have box-like cross-sections while upper and lower horizontal beams 578, 580 lack a corresponding hat-shaped cross-section on first intrusion frame 602. Accordingly, upper and lower horizontal beams 578, 580 are formed only by channel portions 611 on second intrusion frame 604. Alternatively, however, it is also envisioned to provide corresponding channel portions 610 that would form box-like sections for upper and lower horizontal beams 578, 580.

The cross-sectional shape of secondary beam 570 is also illustrated in FIG. 19. First beam stamping 606 has a generally hat-shaped cross-section including a base 630 having spaced apart side walls 632 that terminate in outwardly extending rim flanges 634. Second beam stamping 608 has a generally planar cross-section that is selectively interrupted by arcuate stiffener groove 612. The outer periphery of second beam stamping 608 abuttingly engages and is connected to rim flanges 634 to form a box-like shape.

Figure 20:
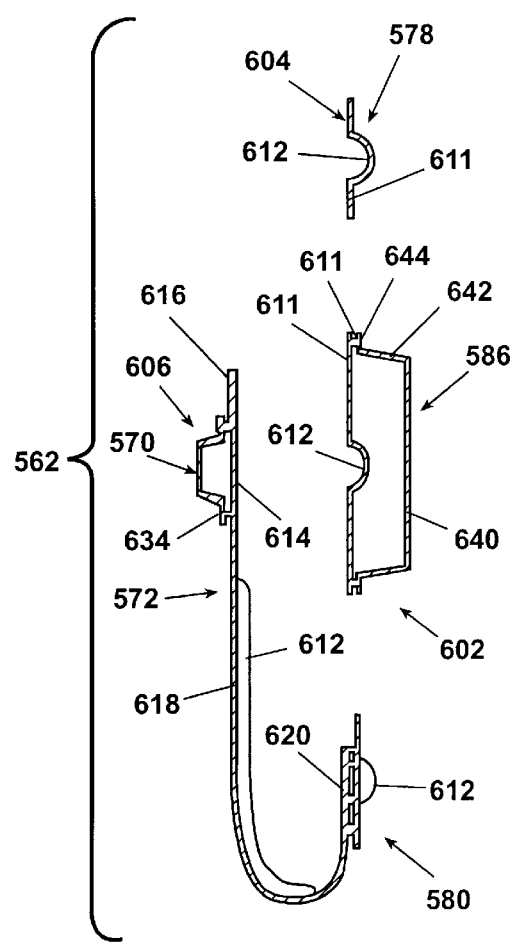

FIG. 20 is a cross-sectional view taken along line 20—20 of FIG. 18. FIG. 20 shows central beam portion 586 having a similar box-shaped cross-section as upper and lower front diagonal arms 590, 592, including a base 640 connected to spaced apart side walls 642 and having outwardly extending rim flanges 644 that abuttingly engage and are connected to an outer periphery of a generally planar channel portion 611 having an arcuate stiffener groove 612 in a central portion thereof. Secondary beam 570 and window brace beam 572 are illustrated having respective box-like cross-sections and a J-shaped cross-section. Upper and lower window brace beam portions 616, 618 extend above and below generally planar strap 614. Strap portion 614 connects to rim flanges 634 of first beam stamping 606. Lower window brace beam section 618 preferably includes a stiffener groove 612 to provide added rigidity. Distal end 620 of window brace beam 572 abuts and is securely connected to lower horizontal beam 580 at a substantially planar portion thereof. However, one or more stiffener grooves 612 can be provided in lower horizontal beam 580.

Although the inventive side intrusion frame has been described above as being integrated with a conventional, hinged, side door, it can also be adapted for use on other types of closure panels. For instance, it may be used on all passenger doors (both front and rear), vertically sliding doors, rear minivan doors, utility vehicle lift-gates, tailgates, and cargo doors, trunks, sliding van doors, or any vehicle opening where it is desired to limit intrusion into the vehicle during a collision. Preferably, the inventive intrusion beam is constructed to cover as much of the opening as possible, and is rigidly tied into the main vehicle structure for added strength when the closure panel is closed. Ideally, the central beam portion is shaped to efficiently distribute the impact forces to the surrounding body, with or without the use of structural keys and receptacles. Moreover, the size, shape, strength and resistance to deformation of the intrusion frame will vary, depending on vehicle size and weight, to meet impact and structural design requirements.

Although generally rectangular shapes as illustrated for the outer frames, it is envisioned that the general shape of the outer frame of the present invention will correspond to the specific door or closure panel to which it is applied. For example, a rear door of a conventional vehicle may have an arcuate lower corner adjacent the rear wheel well. Therefore, the corresponding overall shape of the intrusion frame will generally conform to the non-rectangular or non-quadrolateral shape of a lower portion of such a door. Similarly, the central beam portion of the present invention has been illustrated as a generally, X-shape or overlapping U-shape, however, any suitable shapes can be used to accomplish the function of the central beam portion, depending on design requirements.

Moreover, any features of one disclosed embodiment can be used in conjunction with, or in place of, features in other disclosed embodiments. Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A movable closure for selectively covering an opening in a vehicle comprising:
    a primary structural outer frame having at least one frame member for defining an outer periphery, said primary structural outer frame member connected to a secondary structure;
    a central beam portion within said outer periphery rigidly connected to said primary structural outer frame wherein said central beam portion includes at least one first U-shaped element having a base and first and second outwardly extending arms having distal ends, said base having a length substantially less than a length of said outer frame;
    said distal ends of said outwardly extending arms being rigidly connected to said outer frame; and
    an exterior panel connected to and at least partially covering said outer frame.

2. The movable closure of claim 1, further including a secondary beam extending across said outer frame so as to be positioned alongside of and adjacent to said central beam portion, said secondary beam being attached to said at least one frame member.

3. The movable closure of claim 1, wherein said central beam portion further includes first and second U-shaped elements, each of said first and second U-shaped elements having a base and first and second outwardly extending arms having distal ends, said second U-shaped element positioned in an inverted orientation relative to said first U-shaped element such that said first and second U-shaped elements overlap and said bases of said first and second U-shaped elements are spaced apart.

4. The movable closure of claim 1, wherein said first U-shaped element is disposed with the two arms extending upwardly such that said base is generally parallel to top and bottom portions of said outer frame.

5. The door of claim 4, wherein said base of said first U-shaped element is positioned in a lower half of said outer frame with the arms extending upwardly.

6. A movable closure for selectively covering an opening in a vehicle comprising:
    an outer frame having at least one frame member for defining an outer periphery;
    a central beam portion connected to said outer frame wherein said central beam portion includes at least one first U-shaped element having a base and first and second outwardly extending arms having distal ends, said base having a length substantially less than a length of said outer frame, wherein said first U-shaped element is disposed such that said base is generally perpendicular to top and bottom portions of said outer frame with one arm extending generally upwardly and outwardly and the second aim extending generally downwardly and outwardly;
    said distal ends of said outwardly extending arms being connected to said outer frame; and
    an exterior panel connected to and at least partially covering said outer frame.

7. The movable closure of claim 6, wherein said first U-shaped element is tubular and has a cross-section with at least an upper and a lower wall.

8. The movable closure of claim 7, further including dimples provided in at least one of the upper and lower walls to facilitate controlled collapsing for added energy absorption during a collision impact.

9. The movable closure of claim 1, wherein the outer frame and the central beam portion are formed from stamped sheet metal including a hat-shaped cross-section.

10. The movable closure of claim 6, wherein said closure is one of a trunk lid, a sunroof, and a lift gate.

11. The movable closure of claim 1, further including a plurality of structural, integral keys at predetermined locations on the outer frame for being received in corresponding mating receptacles that are structurally and rigidly connected to a vehicle body such that impact forces are efficiently transferred to a vehicle body during a collision.

12. The door of claim 1, wherein the first U-shaped element is tubular and has a cross-section with at least an upper and a lower wall.

13. The door of claim 12, further including dimples provided in at least one of the upper and lower walls to facilitate controlled collapsing for added energy absorption during a collision impact.

14. The door of claim 1, wherein the outer frame and central beam portion are formed from stamped sheet metal including a hat-shaped cross-section.

15. The door of claim 1, further including a door ring for receiving the outer frame and the central beam portion.

16. A door for selectively closing a vehicle opening comprising:

a door ring defining a secondary structure and having a recess defined by a flange;

a tubular impact intrusion frame located in the recess and positioned adjacent the flange, said impact intrusion frame comprising:

a primary structural outer frame having at least one frame member for defining an outer periphery, a central beam portion rigidly connected to said primary structural outer frame so as to be positioned within said outer periphery and including a plurality of outwardly extending arms, each arm have at least one distal end;

said distal ends of said outwardly extending arms being connected to said primary structural outer frame and wherein said central beam portion includes first and second U-shaped elements each having two of said plurality of outwardly extending arms and a base positioned between said outwardly extending arms, said second U-shaped element being positioned in an inverted, overlapping orientation relative to said first U-shaped element such that said bases of said first and second U-shaped elements are spaced apart; and an exterior panel connected to and at least partially covering said primary structural outer frame.

17. The door of claim 16, further including a secondary beam extending across said outer frame so as to be positioned alongside of and adjacent to said central beam portion, said secondary beam being attached to said at least one frame member.

18. The door of claim 16, further comprising dimples provided in at least one of an upper and a lower wall of the tubular impact intrusion frame to facilitate controlled collapsing for added energy absorption during a collision impact.

19. A door for selectively closing a vehicle opening comprising:

a door ring having a recess defined by a flange;

a tubular impact intrusion frame located in the recess and positioned adjacent the flange, said impact intrusion frame comprising:

an outer frame having at least one frame member for defining an outer periphery;

a central beam portion connected to said outer frame and including a plurality of outwardly extending arms, each arm have at least one distal end;

said distal ends of said outwardly extending arms being connected to said outer frame and wherein said central beam portion includes first and second U-shaped elements each having two of said plurality of outwardly extending arms, said second U-shaped element being positioned in an inverted, overlapping orientation relative to said first U-shaped element and wherein said first U-shaped element includes recesses for receiving intersecting portions of said second U-shaped element;

wherein said first U-shaped element is disposed with a base thereof generally vertical with the one arm extending generally upwardly and outwardly and the second arm extending generally downwardly and outwardly; and an exterior panel connected to and at least partially covering said outer frame.

20. A door for selectively closing a vehicle opening comprising:

a primary structural outer frame having at least one frame member for defining an outer periphery, said primary structural outer frame member connected to a secondary structure;

a central beam portion rigidly connected to said primary structural outer frame within said outer periphery wherein said central beam portion is divergent, being positioned at approximately the center of said outer frame and having a center portion of central beam portion having a length substantially less than a length of said outer frame and two upwardly and outwardly extending arms and two downwardly and outwardly extending arms, each of said arms having a distal end;

said distal ends of said outwardly extending arms being rigidly connected to said outer frame; and an exterior panel connected to and at least partially covering said outer frame.

21. The movable closure of claim 1, wherein said central beam portion is substantially in-plane with said primary structural outer frame.

22. The movable closure of claim 20, wherein said central beam portion is substantially in-plane with said primary structural outer frame.

* * * * *